(12) United States Patent
Iezzi et al.

(10) Patent No.: US 9,527,062 B2
(45) Date of Patent: Dec. 27, 2016

(54) PROCESS FOR SCALABLE SYNTHESIS OF MOLYBDENUM DISULFIDE MONOLAYER AND FEW-LAYER FILMS

(71) Applicant: North Carolina State University, Raleigh, NC (US)

(72) Inventors: Brian C. Iezzi, Raleigh, NC (US); Yanpeng Li, Raleigh, NC (US); Linyou Cao, Raleigh, NC (US); Yifei Yu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 177 days.

(21) Appl. No.: 14/274,154

(22) Filed: May 9, 2014

(65) Prior Publication Data

US 2014/0353166 A1 Dec. 4, 2014

Related U.S. Application Data

(60) Provisional application No. 61/821,289, filed on May 9, 2013.

(51) Int. Cl.
| | | |
|---|---|---|
| *B01J 37/02* | (2006.01) | |
| *B01J 27/051* | (2006.01) | |
| *C25B 1/04* | (2006.01) | |
| *B01J 23/28* | (2006.01) | |
| *B01J 35/00* | (2006.01) | |

(52) U.S. Cl.
CPC ............ *B01J 27/051* (2013.01); *B01J 23/28* (2013.01); *B01J 35/004* (2013.01); *B01J 37/0238* (2013.01); *C25B 1/04* (2013.01)

(58) Field of Classification Search
CPC ......... B01J 37/0238; B01J 27/051; C25B 1/04
See application file for complete search history.

(56) References Cited

U.S. PATENT DOCUMENTS

| | | | | |
|---|---|---|---|---|
| 6,284,366 B1* | 9/2001 | Konig | ................... | C23C 16/305 |
| | | | | 428/336 |
| 2012/0217169 A1* | 8/2012 | Long | ........................ | C25B 3/04 |
| | | | | 205/637 |
| 2014/0251204 A1* | 9/2014 | Najmaei | ................. | C30B 25/04 |
| | | | | 117/95 |

OTHER PUBLICATIONS

Li et al., "Atmospheric Pressure Chemical Vapor Deposition: An Alternative Route to Large-Scale MoS2 and WS2 Inorganic Fullerene-like Nanostructures and Nanoflowers," Chem. Eur. J. 2004, 10, 6163-6171.*
Yu et al., "Controlled Scalable Synthesis of Uniform, High-Quality Monolayer and Few-layer MoS2 Films," Scientific Reports 2013, 3:1866, pp. 1-5.*

(Continued)

*Primary Examiner* — Nicholas A Smith
(74) *Attorney, Agent, or Firm* — Thomas | Horstemeyer, LLP

(57) ABSTRACT

The present disclosure relates to nanosheet synthesis. More particularly, the present disclosure relates to molybdenum sulfide ($MoS_2$) atomic thin films and hydrogen evolution reactions. In one or more embodiments, a synthesis process may include sublimation of sulfur and $MoCl_5$, reaction of $MoCl_5$ and S to produce gaseous $MoS_2$ species, transfer of the $MoS_2$ species by carrier gas, diffusion of $MoS_2$ species from the gas phase onto receiving substrates, and precipitation of $MoS_2$ on the substrates.

20 Claims, 28 Drawing Sheets

Figure 1:
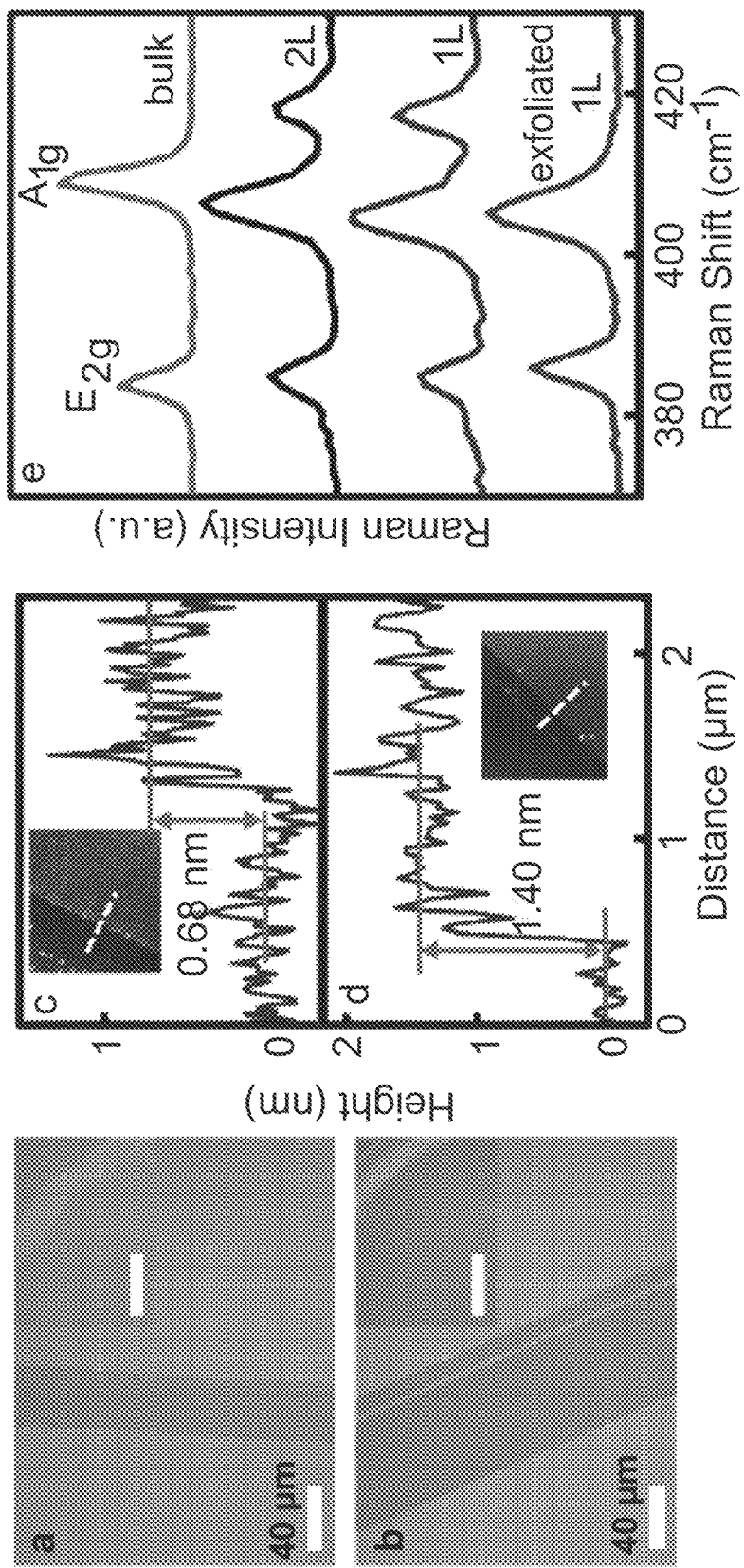

Schematic illustration of the synthetic process.

$$P_{Mo} = \frac{\Phi_{Mo} A_{Mo}}{\Phi_{Mo} A_{Mo} + \Phi_S A_S + J_{Ar}} P_{total} \quad (S1)$$

$$P_{Mo} = \frac{\Phi_{Mo} A_{Mo}}{\Phi_S A_S} P_{total} \quad (S2)$$

(56) References Cited

OTHER PUBLICATIONS

Large area single crystal (0001) oriented MoS2 Laskar, Masihhur R. and Ma, Lu and Kannappan, Santhakumar and Sung Park, Pil and Krishnamoorthy, Sriram and Nath, Digbijoy N. and Lu, Wu and Wu, Yiying and Rajan, Siddharth, Applied Physics Letters, 102, 252108 (2013).*

Zhan, Y., Liu, Z., Najmaei, S., Ajayan, P. M. and Lou, J. (2012), Large-Area Vapor-Phase Growth and Characterization of MoS2 Atomic Layers on a SiO2 Substrate. Small, 8: 966-971.*

Lee, Y.-H., Zhang, X.-Q., Zhang, W., Chang, M.-T., Lin, C.-T., Chang, K.-D., Yu, Y.-C., Wang, J. T.-W., Chang, C.-S., Li, L.-J. and Lin, T.-W. (2012), Synthesis of Large-Area MoS2 Atomic Layers with Chemical Vapor Deposition. Adv. Mater., 24: 2320-2325.*

\* cited by examiner

Schematic illustration of the synthetic setup.

X-ray photoemission spectroscopy of synthetic $MoS_2$ films.

AFM characterization of MoS2 monolayer and bilayer films grown on sapphire substrates.

AFM characterization of $MoS_2$ monolayer and bilayer films grown on $SiO_2/Si$ substrates.

Characterization of exfoliated MoS$_2$ monolayer and bilayer.

Raman spectra of MoS$_2$ monolayer (IL), bilayer (2L), and tetralayer (4L) films on SiO$_2$/Si substrates.

Topview of the AFM image given in FIG. 2D.

AFM images taken from different area of a MoS₂ monolayer grown on sapphire.

Raman spectra collected from eight different areas of the $MoS_2$ bilayer film grown on sapphire.

AFM images collected from different areas of MoS$_2$ bilayer grown on sapphire.

Transmission electron microscope
characterization of synthetic MoS₂ films.

FFT pattern of the atomic image shown in Figure 3a.

Structure model for 211-MoS$_2$.

Photoluminescence of an as-grown MoS$_2$ monolayer and same monlayer transferred to SiO$_2$/Si substrate.

Photoluminescence of synthetic $MoS_2$ grown on sapphire and on $SiO_2/Si$.

Photoluminescence of as-grown MoS$_2$ monolayer and bilayer on sapphire.

| Amount of $MoCl_5$ | < 1 mg | 1-4 mg | 5-10 mg | 11-15 mg | 16-25 mg |
|---|---|---|---|---|---|
| Layer number of $MoS_2$ film | No deposition | 1 layer | 2 layer | 3 layer | 4 layer |
| $\Delta k$ ($A_{1g}$-$E_{2g}$) | N/A | 20.2 - 21.2 $cm^{-1}$ | 21.6 - 22.4 $cm^{-1}$ | 23.0 - 23.2 $cm^{-1}$ | 23.8 - 24.0 $cm^{-1}$ |

The Correlation of the amount of $MoCl_5$ vs. the layer number of $MoS_2$ films.

Raman spetra of the $MoS_2$ thin films grown using different amount of $MoCl_5$.

AFM measurements of the MoS$_2$ thin films grown using different amount of MoCl$_5$.

MoS₂ materials grown under widely different total pressures.

Raman spectra of the MoS$_2$ thin films grown under different total pressures.

Schematic illustration of the synthetic process.

$$P_{Mo} = \frac{\Phi_{Mo} A_{Mo}}{\Phi_{Mo} A_{Mo} + \Phi_S A_S + J_{Ar}} P_{total} \quad (S1)$$

$$P_{Mo} = \frac{\Phi_{Mo} A_{Mo}}{\Phi_S A_S} P_{total} \quad (S2)$$

Raman spectra of the MoS$_2$ thin films grown under different flow rates of carrier gas.

Raman spectra of the MoS$_2$ thin films grown in receiving substrates with different temperatures.

Raman spectra of the MoS₂ thin films grown on different substrates.

PROCESS FOR SCALABLE SYNTHESIS OF MOLYBDENUM DISULFIDE MONOLAYER AND FEW-LAYER FILMS

CROSS REFERENCE TO RELATED APPLICATIONS

This application claims the benefit of 61/821,289 filed May 9, 2013, Iezzi et al. entitled "NOVEL PROCESS FOR SCALABLE SYNTHESIS OF MOLYBDENUM DISULFIDE MONOLAYER AND FEW-LAYER FILMS," which is hereby incorporated by reference in its entirety.

STATEMENT REGARDING FEDERALLY SPONSORED RESEARCH OR DEVELOPMENT

This invention was made with government support under grant number W911NF-11-1-0529 awarded by the U.S. Army Research Office. The government has certain rights to this invention.

1. FIELD OF THE INVENTION

The present disclosure relates to synthesis of monolayer and few-layer films. More particularly, the present disclosure relates to molybdenum sulfide ($MoS_2$) and hydrogen evolution reactions.

2. BACKGROUND OF THE INVENTION

Demand for hydrogen in relation to fuel cells and energy is expected to reach $14 billion by 2014. Demand for hydrogen is increasing at about 10% per year and will likely increase as more and more companies move towards renewable energy generation such as, for example, in hydrogen fuel cell processes. High quality hydrogen is necessary for these processes, and current platinum catalysts simply do not meet the needs economically.

Molybdenum sulfide ($MoS_2$) monolayers, with a direct bandgap of 1.8 eV, offer an unprecedented prospect of miniaturizing semiconductor science and technology down to a truly atomic scale. However, there is no way that is able to produce uniform, and high-quality monolayer or few-layer $MoS_2$ in a wafer-scale.

Progress is needed toward developing competitive materials to reduce the cost of current, expensive catalysts. A sustainable and economical solution to hydrogen production is needed.

3. SUMMARY OF THE INVENTION

In particular non-limiting embodiments, the present invention provides A synthesis process comprising: (a) sublimation of sulfur and $MoCl_5$; (b) reaction of $MoCl_5$ and S to produce gaseous $MoS_2$ species; (c) transfer of the $MoS_2$ species by carrier gas; (d) diffusion and precipitation of $MoS_2$ species from the gas phase onto a substrate under suitable conditions that one to four layer(s) of $MoS_2$ form on the substrate.

The $MoCl_5$ may be reacted with sulfur at a temperature of about 300° C. to about 1000° C. or about 600° C. to about 900° C. to give rise to $MoS_2$ on the substrate. The substrate may be highly ordered pyrolytic graphic (HOPG).

The synthesis process wherein one layer, two layers of $MoS_2$ or four layers of $MoS_2$ may be formed on the substrate.

The invention also provides a method of producing hydrogen which comprises contacting a suitable reactant under appropriate conditions with the layered $MoS_2$ substrate prepared by the synthesis process.

4. BRIEF DESCRIPTION OF THE FIGURES

FIG. 1—Controlled synthesis of $MoS_2$ monolayer and bilayer films: (a and b) Optical images of the $MoS_2$ monolayer and bilayer films grown on sapphire substrates, respectively. The insets are optical images of the $MoS_2$ monolayer and bilayer films grown on $SiO_2$/Si substrates. The scale bars in the insets are 80 μm. (c and d) AFM height profiles for typical $MoS_2$ monolayer and bilayer films grown on sapphire, respectively. The insets show the AFM images from which the height profiles are extracted.

Figure 2:
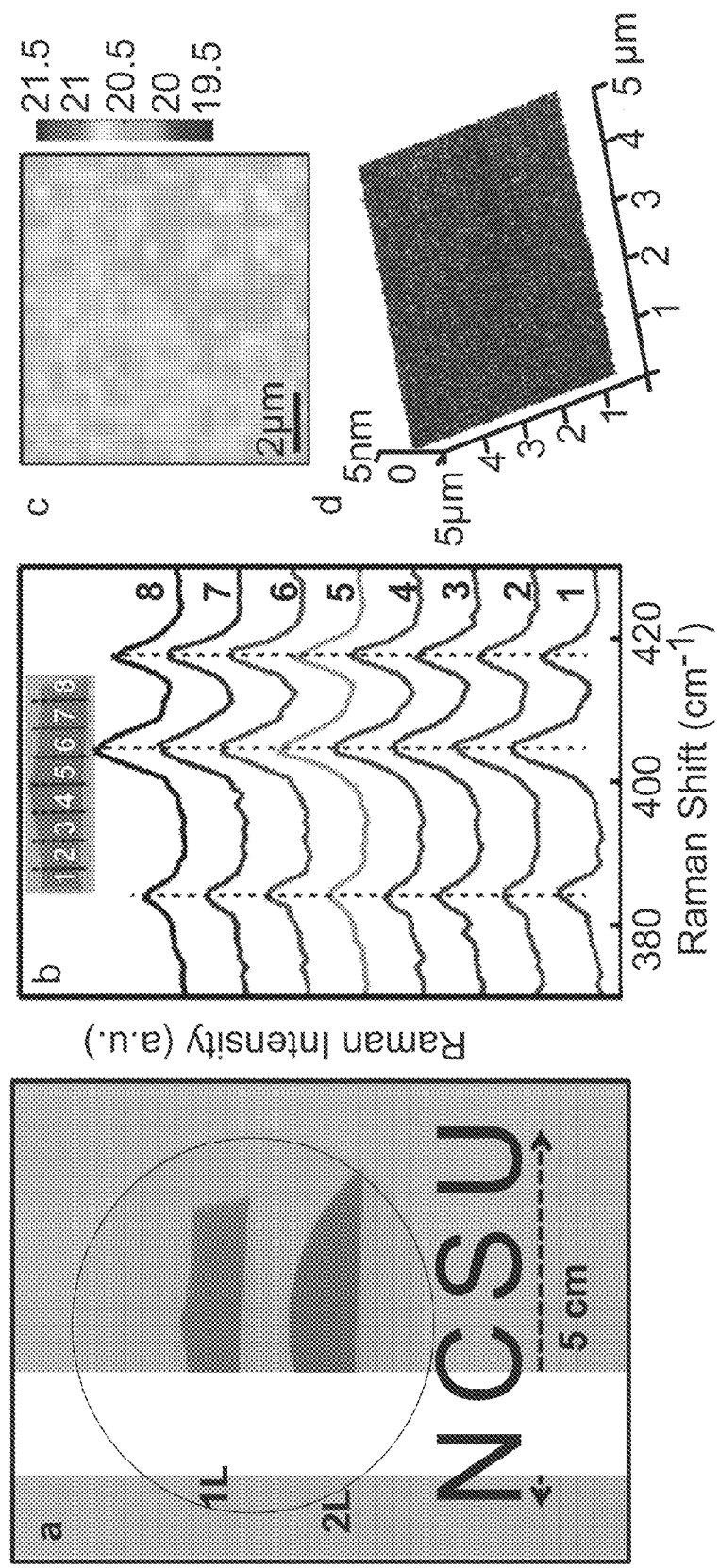

FIG. 2—Large-area uniformity of the synthesized $MoS_2$ monolayer and bilayer films: (a) A picture for as-grown $MoS_2$ monolayer (1L) and bilayer (2L) films, along with a NCSU logo. Underneath the films is a blank sapphire wafer, which is transparent and used as a reference. (b) Raman spectra collected from eight different areas of the $MoS_2$ monolayer film. The inset schematically illustrates how the eight areas distribute across the substrate. (c) Map of the Raman frequency difference Δk collected from an area of 10 μm×10 μm in the $MoS_2$ monolayer film. All the measured Δk are in the range of 20.3-20.7 $cm^{-1}$. Mapping step: 0.5 μm. (d) Perspective view of a typical AFM image collected from the $MoS_2$ monolayer film.

Figure 3:
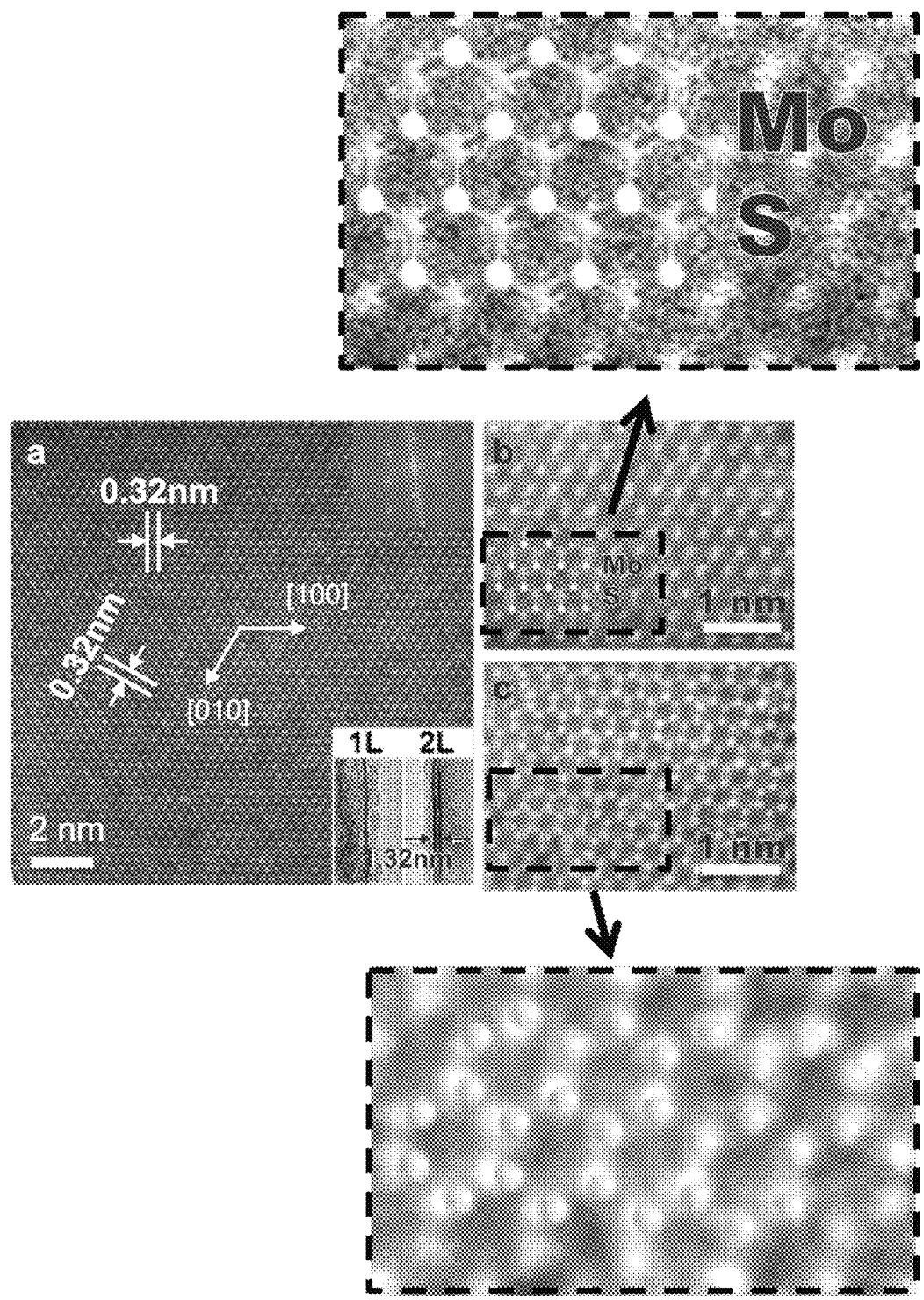

FIG. 3—Characterization of the crystal structure of synthesized $MoS_2$ monolayer and bilayer films:

(a) High angle annular dark field (HAADF) image of typical $MoS_2$ monolayer film. Upper inset is the corresponding FFT pattern, which is not indexed for visual convenience (an indexed version is given in Fig. S13a). Lower inset shows the folded edges of $MoS_2$ monolayer and bilayer films. The lattice constant and important crystalline directions are given as shown.

(b and c) HAADF of $MoS_2$ monolayer and bilayer films. The image of the bilayer film (c) is FFT-filtered. The insets show modeled crystal structures of $MoS_2$ monolayer and bilayer films with blue and yellow dots corresponding to Mo and S atoms, respectively. The sulfur atom in the inset of (c) is not given for visual convenience. The scale bars are 1 nm.

Figure 4:
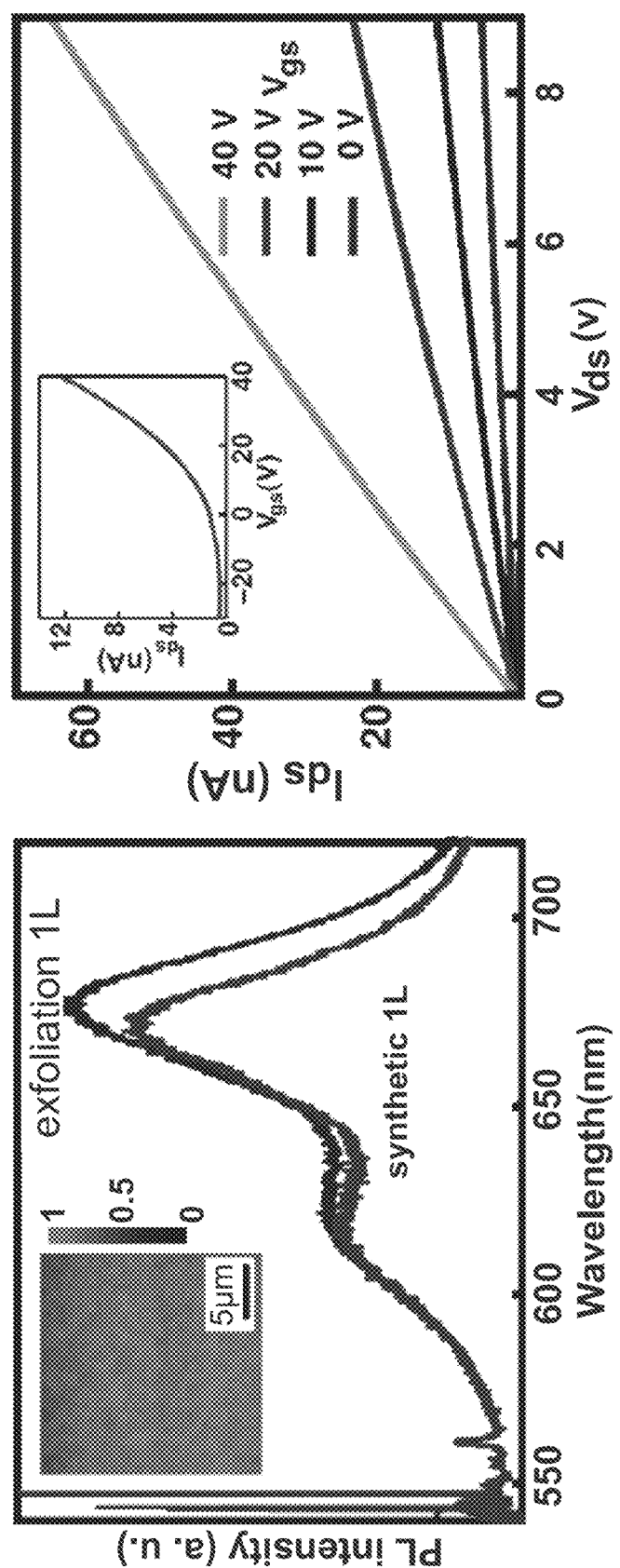

FIG. 4—Optical and electrical characterizations of the synthesized $MoS_2$ monolayer films:

(a) Photoluminescence (PL) of the synthesized and exfoliated $MoS_2$ monolayers. Both were dispersed on $SiO_2$/Si substrates. The synthesized monolayer was grown on sapphire substrates and then transferred to $SiO_2$/Si substrates for the PL measurement. Inset is PL mapping of an as-grown $MoS_2$ monolayer on sapphire substrates with the color representing normalized PL intensity at 665 nm as illustrated by the color bar.

(b) $I_{ds}$-$V_{ds}$ curve for a field effect transistor (FET) made with the synthesized $MoS_2$ monolayer with gating voltages $V_{gs}$ 0, 10, 20, 40 V. Inset, transfer characteristic for the FET with a source drain bias $V_{ds}$ of 2 V.

Figure 5:
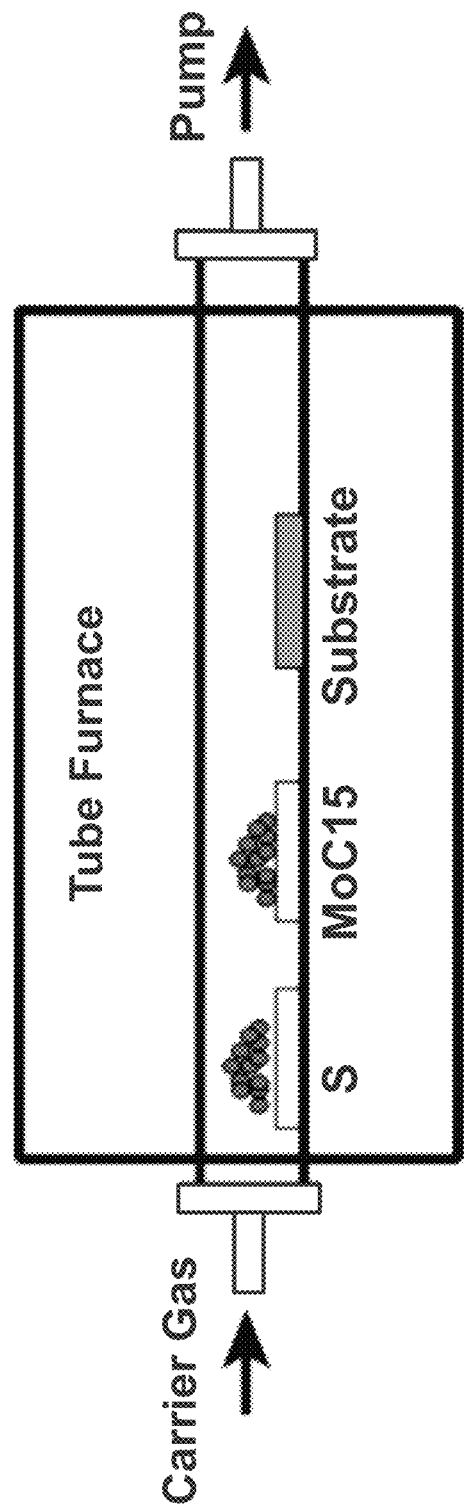

FIG. 5 Schematic illustration of the synthetic setup used for the non-catalytic chemical vapor deposition growth of atomic-thin $MoS_2$ films.

Figure 6:
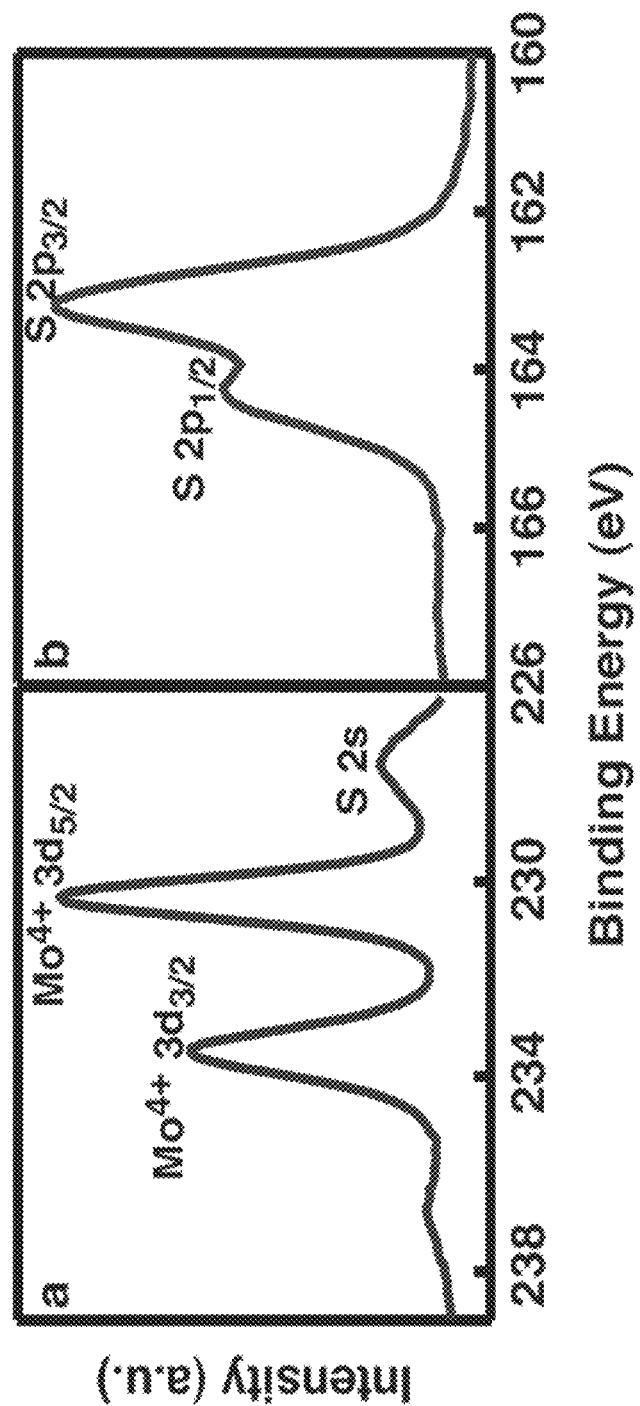

FIG. 6 X-ray photoemission spectroscopy of synthetic MoS2 films. Binding energies for (a) Mo atoms and (b) sulfur atoms.

Figure 7:
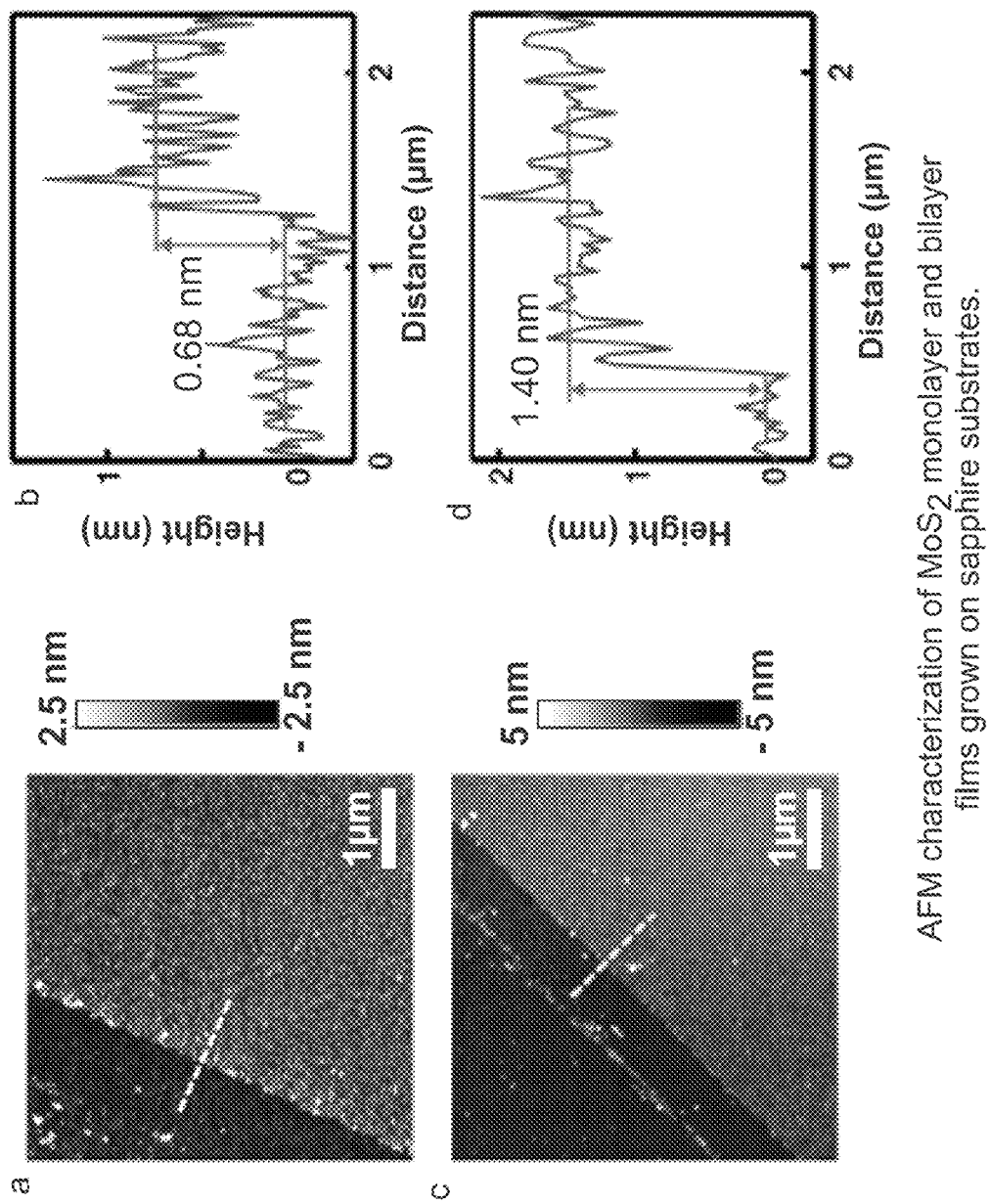

FIG. 7 AFM characterization of $MoS_2$ monolayer and bilayer films grown on sapphire substrates. (a) Typical AFM image of the synthetic monolayer. The area occupied by the MoS$_2$ is labeled as shown. (b) Height profile for the white dashed line in (a). (c) Typical AFM image of the synthetic bilayer. The area occupied by the MoS$_2$ is labeled as shown. (d) Height profile for the white dashed line shown in (c).

Figure 8:
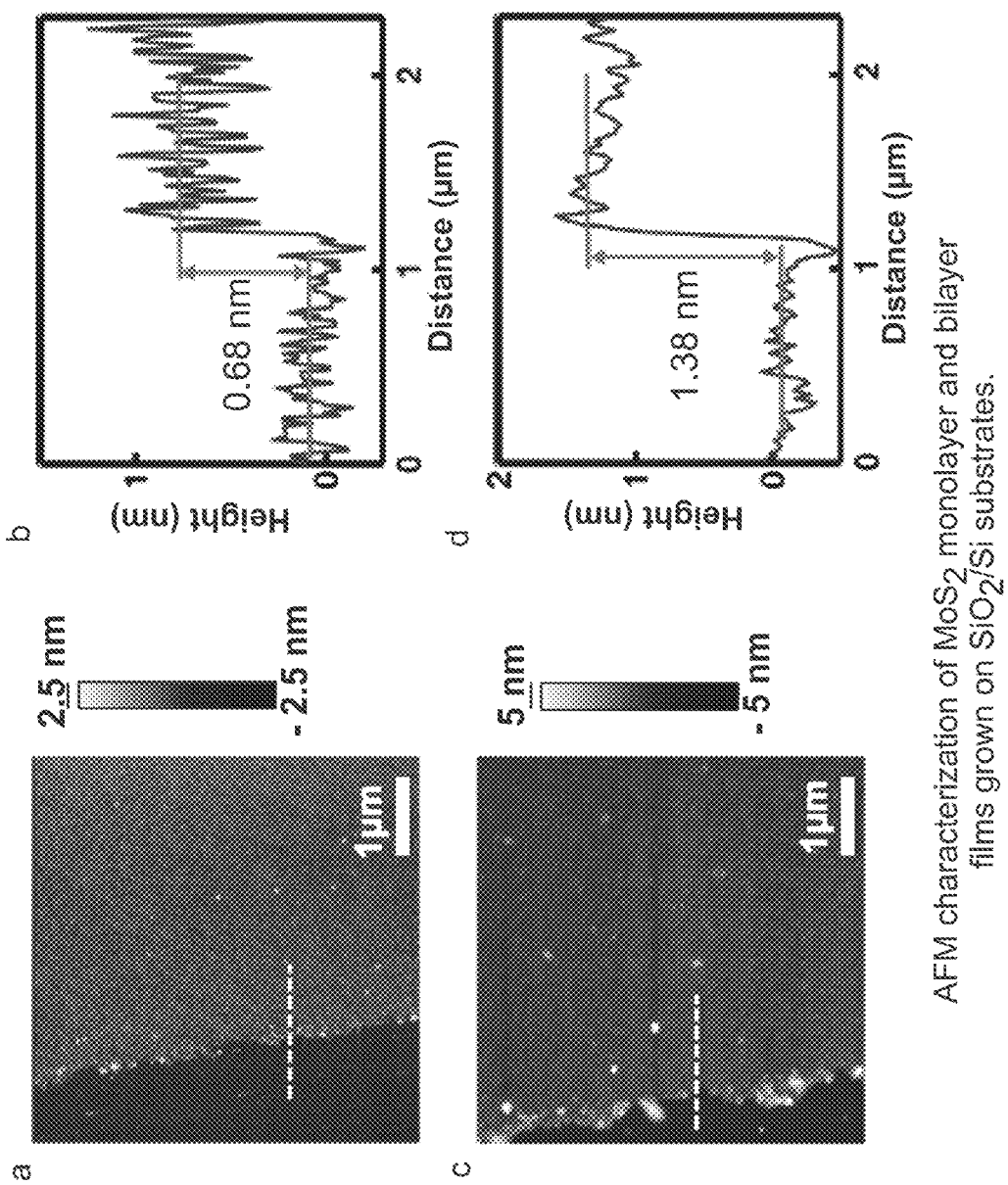

FIG. 8 AFM characterization of MoS$_2$ monolayer and bilayer films grown on SiO$_2$/Si substrates. (a) Typical AFM image of the synthetic monolayer. The area occupied by the MoS$_2$ is labeled as shown. (b) Height profile for the white dashed line in (a). (c) Typical AFM image of the synthetic bilayer. The area occupied by the MoS2 is labeled as shown. (d) Height profile for the white dashed line shown in (c).

Figure 9:
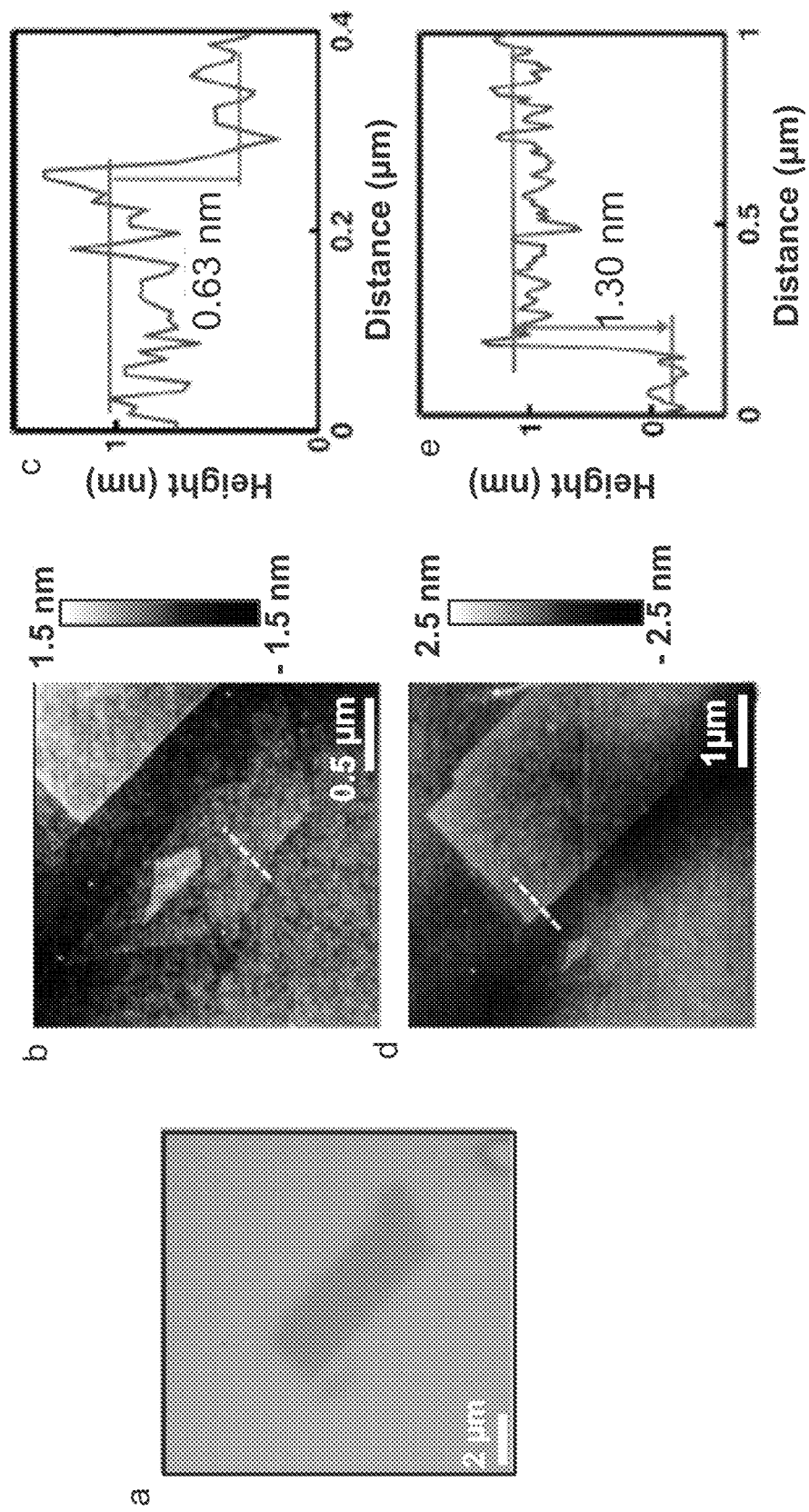

FIG. 9 Characterization of exfoliated MoS$_2$ monolayer and bilayer. (a) Optical image of exfoliated monolayer and bilayer dispersed on SiO$_2$/Si substrates. (b and d) AFM images of the exfoliated MoS$_2$ monolayer and bilayer. The two images have different magnification to better illustrate the monolayer and bilayer respectively. (c and e) Height profile for the white dashed lines shown in (b) and (d).

Figure 10:
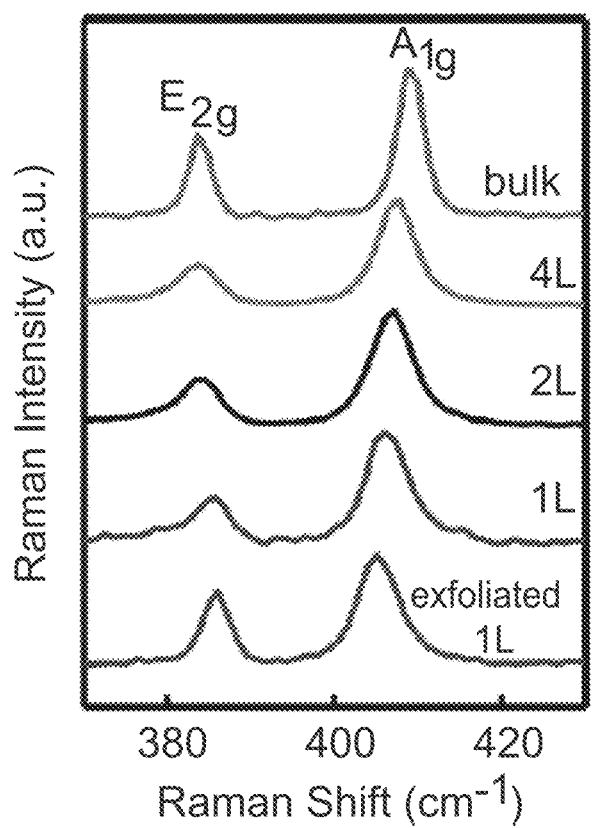

FIG. 10 Raman spectra of the MoS$_2$ monolayer (1L), bilayer (2L), and tetralayer (4L) films grown on SiO$_2$/Si substrates. Also given are the Raman spectra of exfoliated MoS$_2$ monolayer and bulk MoS$_2$ dispersed on SiO$_2$/Si substrates. The two characteristic Raman modes are labeled.

Figure 11A:
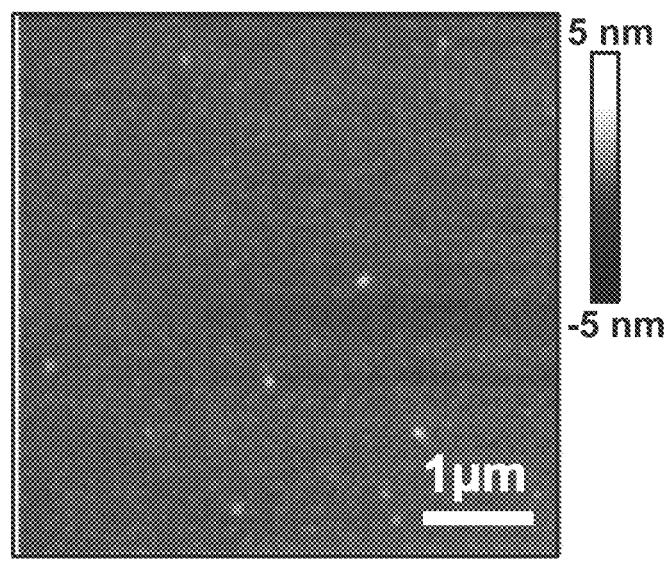

FIG. 11A Topview of the AFM image given in FIG. 2(panel d) of the text, roughness <0.2 nm.

Figure 11B:
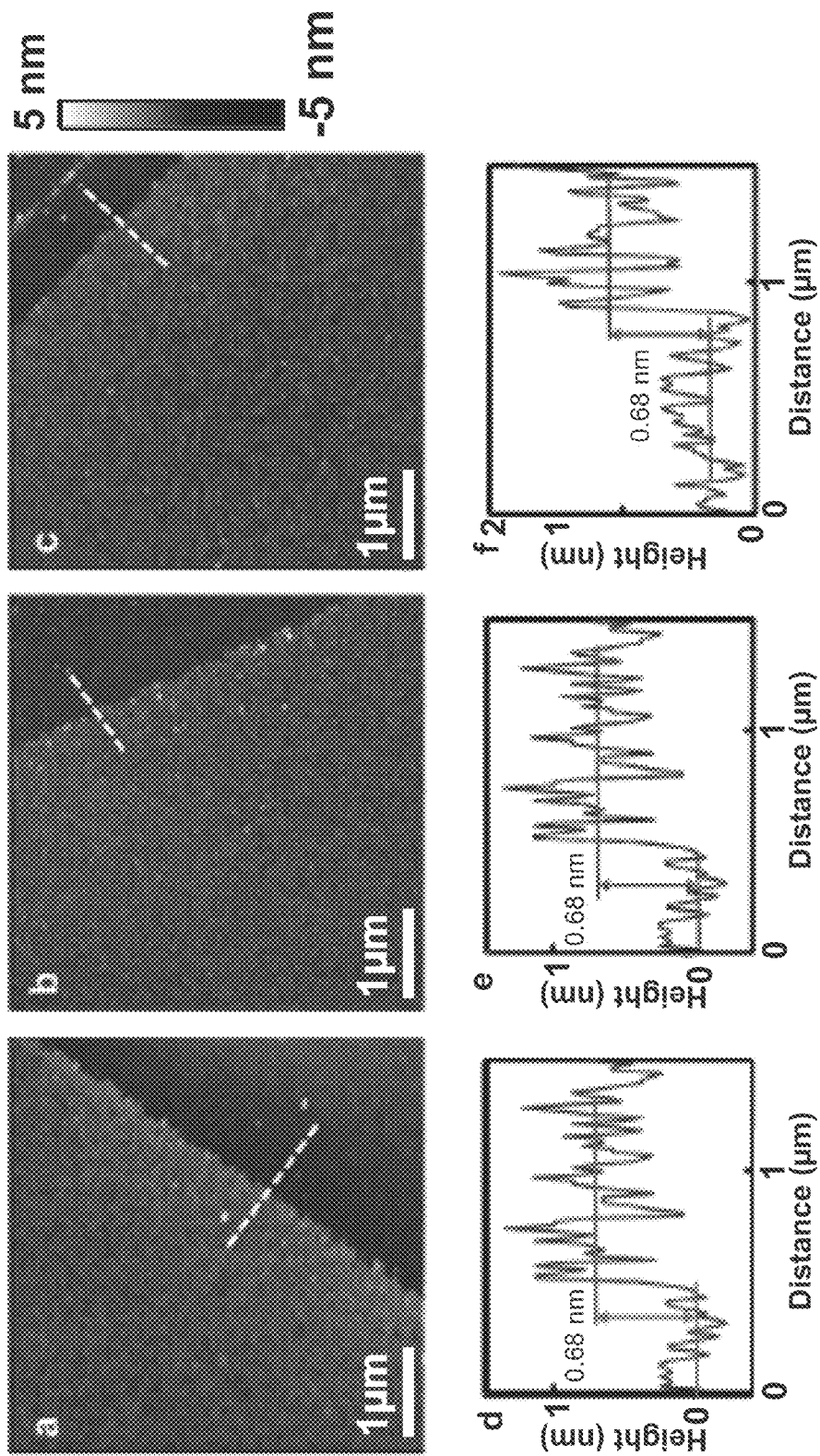

FIG. 11B (a, b, and c) AFM images taken from different areas of a MoS$_2$ monolayer grown on sapphire. The distances between the positions that the images were collected are from at least 1 cm. (d, e, and f) Height profiles for the white dashed lines given in (a), (b) and (c) respectively.

Figure 12:
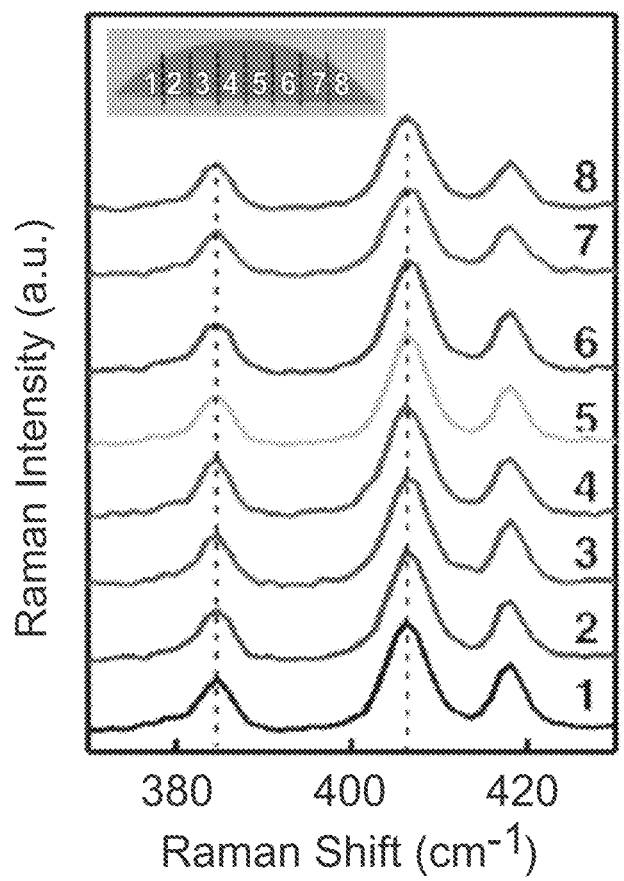

FIG. 12 Raman spectra collected from eight different areas of the MoS$_2$ bilayer films grown on sapphire. The inset shows the eight areas evenly distributed across the substrate.

Figure 13:
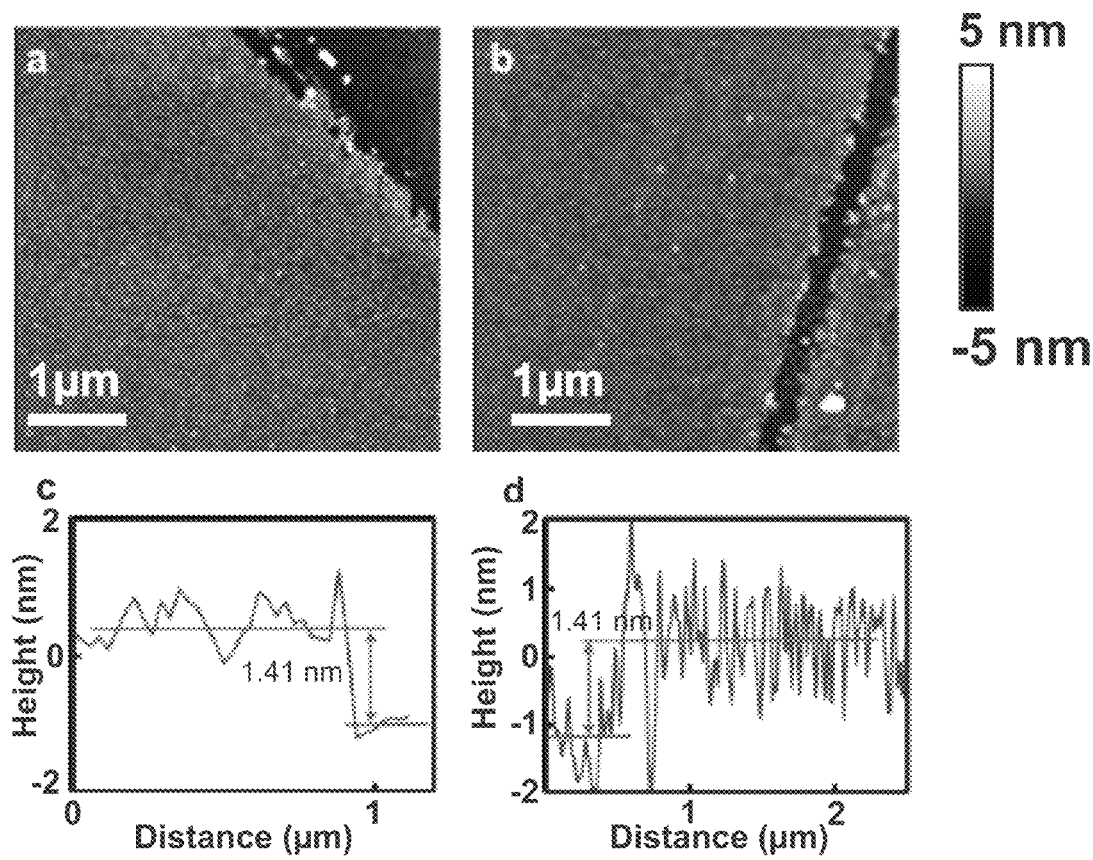

FIG. 13 (a and b) AFM images collected from different areas of a MoS$_2$ bilayer grown on sapphire. The distance between the positions that the images were collected from is larger than 1 cm. (c and d) Height profiles for the white dashed lines given in (a) and (b) respectively.

Figure 14:
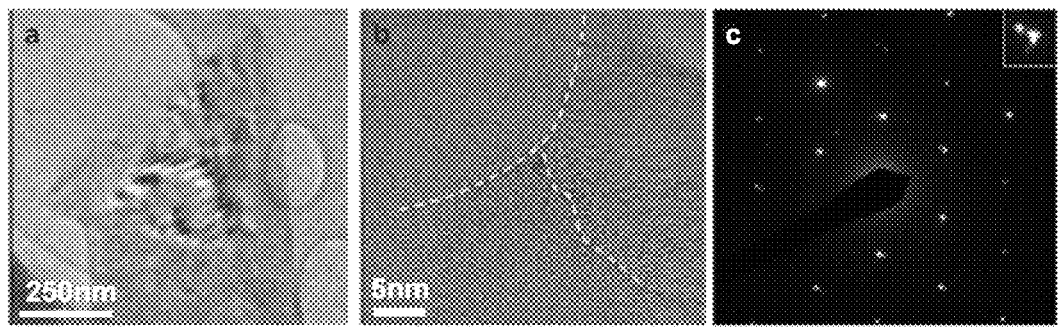

FIG. 14 Transmission electron microscope characterization of synthetic MoS$_2$ films. (a) Typical TEM image of synthetic MoS$_2$ films. (b) TEM image showing multiple crystalline domains. The white dashed lines indicate the domain boundary. (c) Typical selected area electron diffraction for the synthetic MoS2 film. Inset a magnified diffraction spot showing multiple points involved. This indicates that the synthetic film is polycrystalline.

Figure 15:
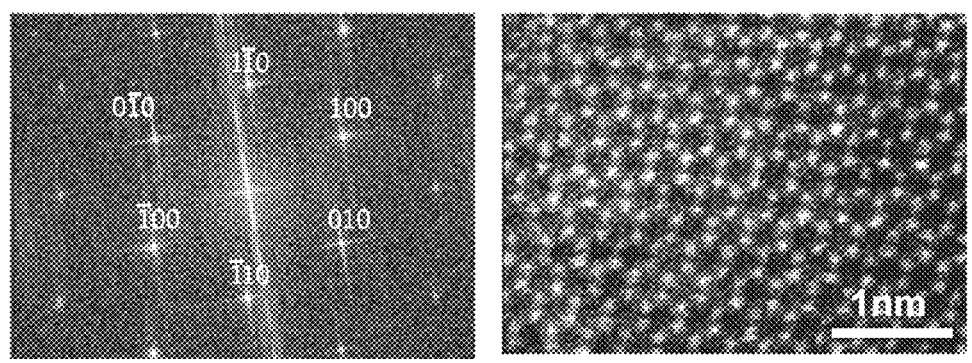

FIG. 15 (a) FFT pattern of the atomic image shown in FIG. 3 (panel a) of the text. The pattern is indexed. (b) The original HAADF image of FIG. 3 (panel c) in the text.

Figure 16:
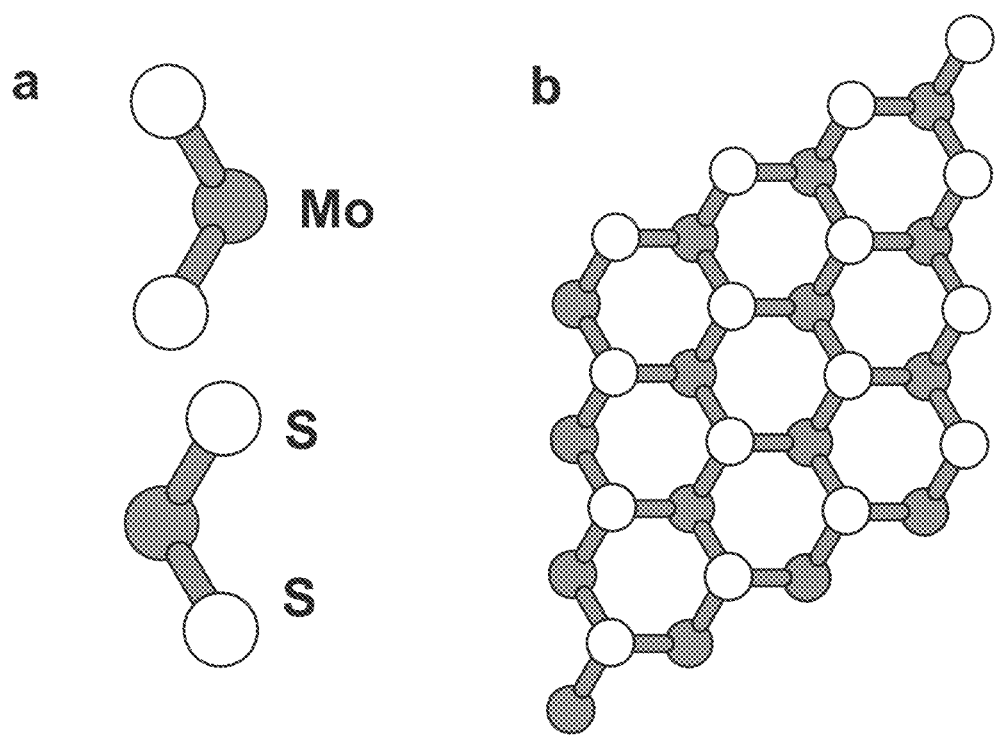

FIG. 16 Structure model for 2H—MoS$_2$. (a) Crystal structure viewed from the [010] direction. (b) Crystal structure viewed from the [001] direction. The dark spheres indicate the Mo atoms, the light spheres indicate the S atoms.

Figure 17:
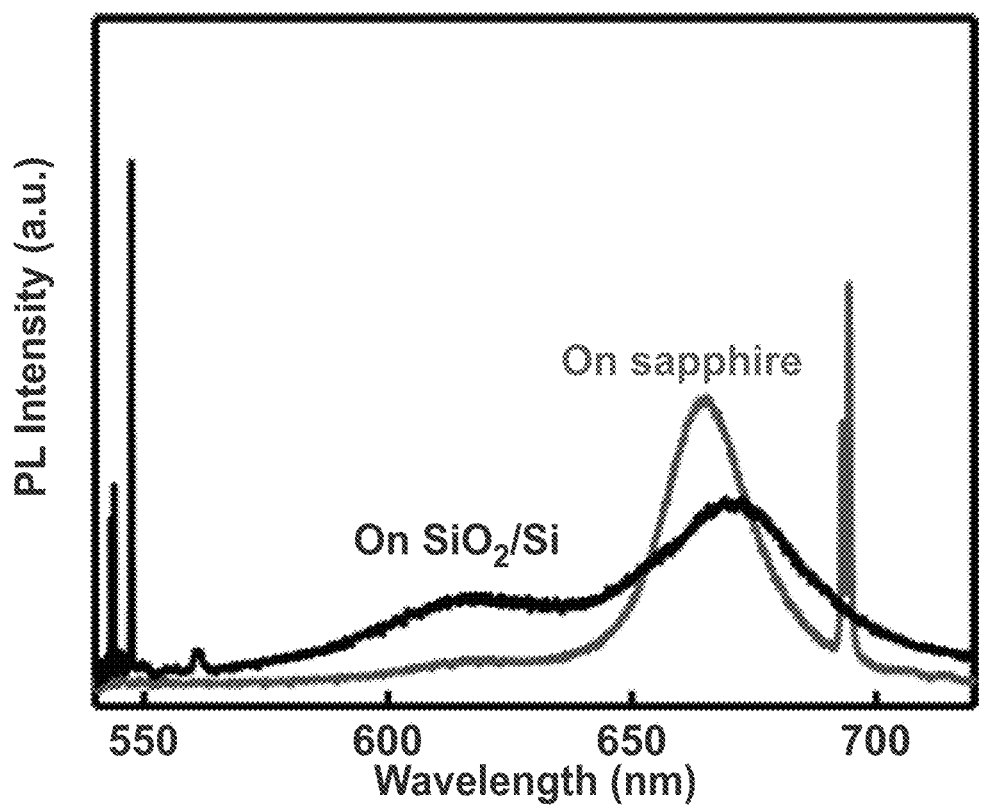

FIG. 17 Photoluminescence of an as-grown MoS$_2$ monolayer on sapphire and the same monolayer transferred to SiO$_2$/Si substrate.

Figure 18:
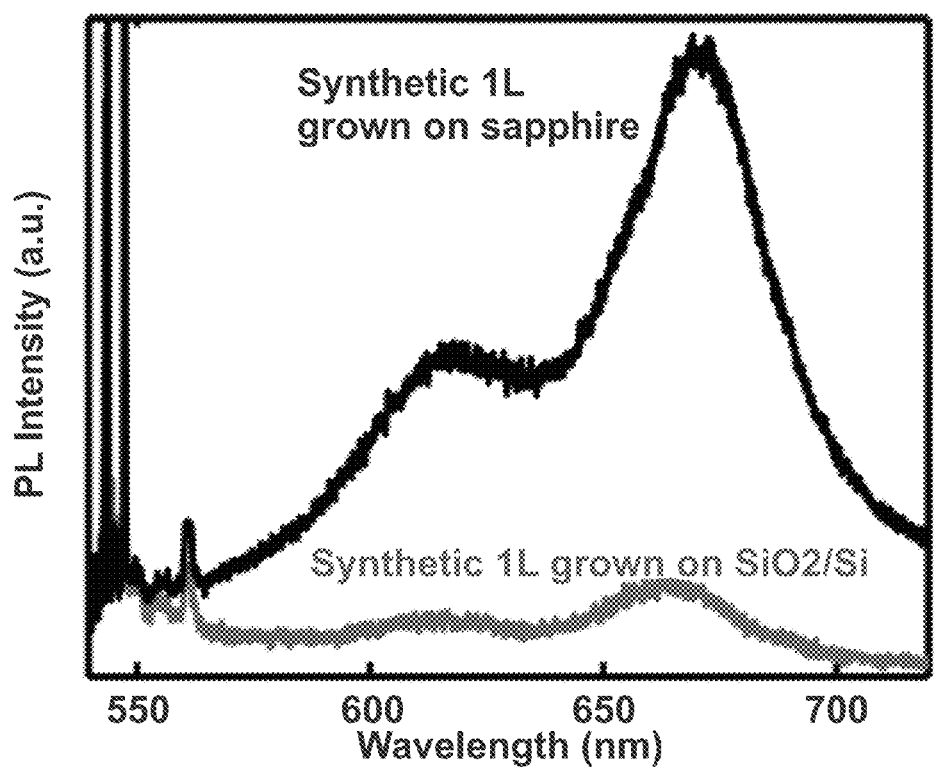

FIG. 18 Photoluminescence of synthetic MoS$_2$ monolayer on sapphire and the same monolayer transferred to SiO$_2$/Si substrates for the PL measurement.

Figure 19:
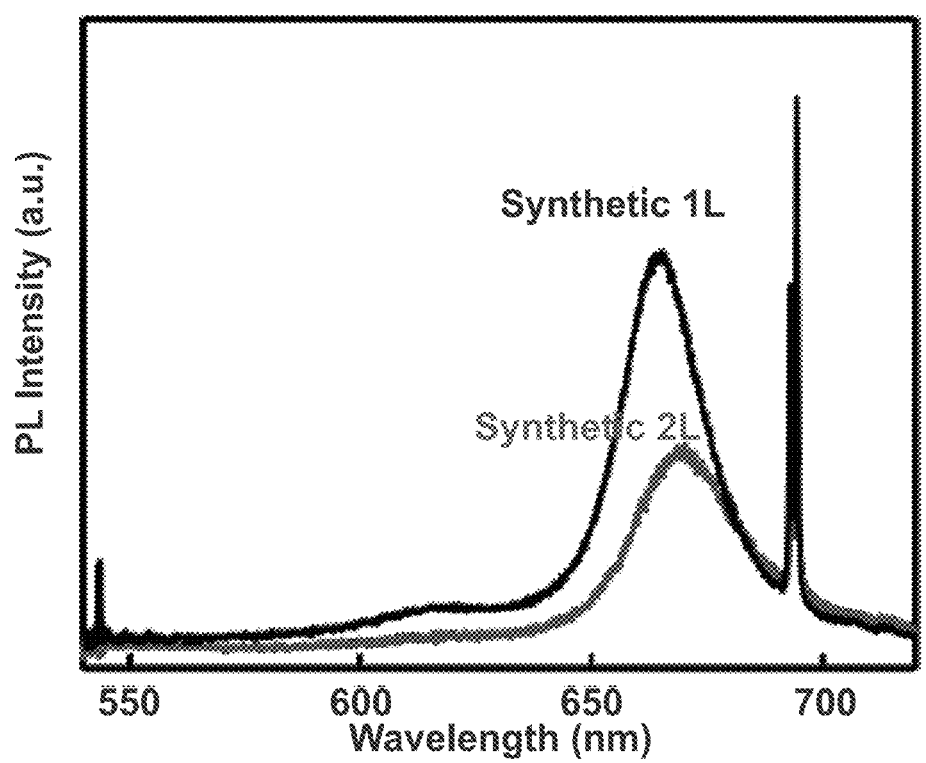

FIG. 19 Photoluminescence of an as-grown MoS$_2$ monolayer (1L) and bilayer (2L) on sapphire.

Figures 20, 21:
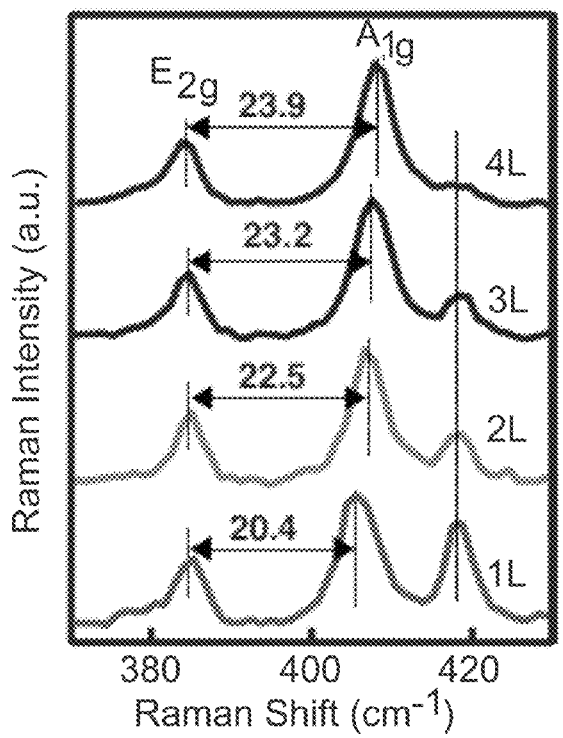

FIG. 20 Correlation of the amount of MoCl$_5$ vs. the layer number of MoS$_2$ films. Note: typical experimental conditions used in these growths include: deposition temperature, 850° C.; total pressure, 2-3 torr; flow rate 50 sccm; amount of sulfur, 1 g.

FIG. 21 Rama spectra of the MoS$_2$ thin films grown with different amounts of MoCl$_5$. These films have different layer numbers (1L, 2L, 3L, and 4L) as labeled. The layer number was confirmed as shown in FIG. 15. The line to the right indicates the Raman peak of the sapphire substrate. The other lines indicate the positions of the E$_{2g}$ and A$_{1g}$ peaks of the MoS$_2$ thin films. The frequency difference between the two peaks is given in the figure.

Figure 22:
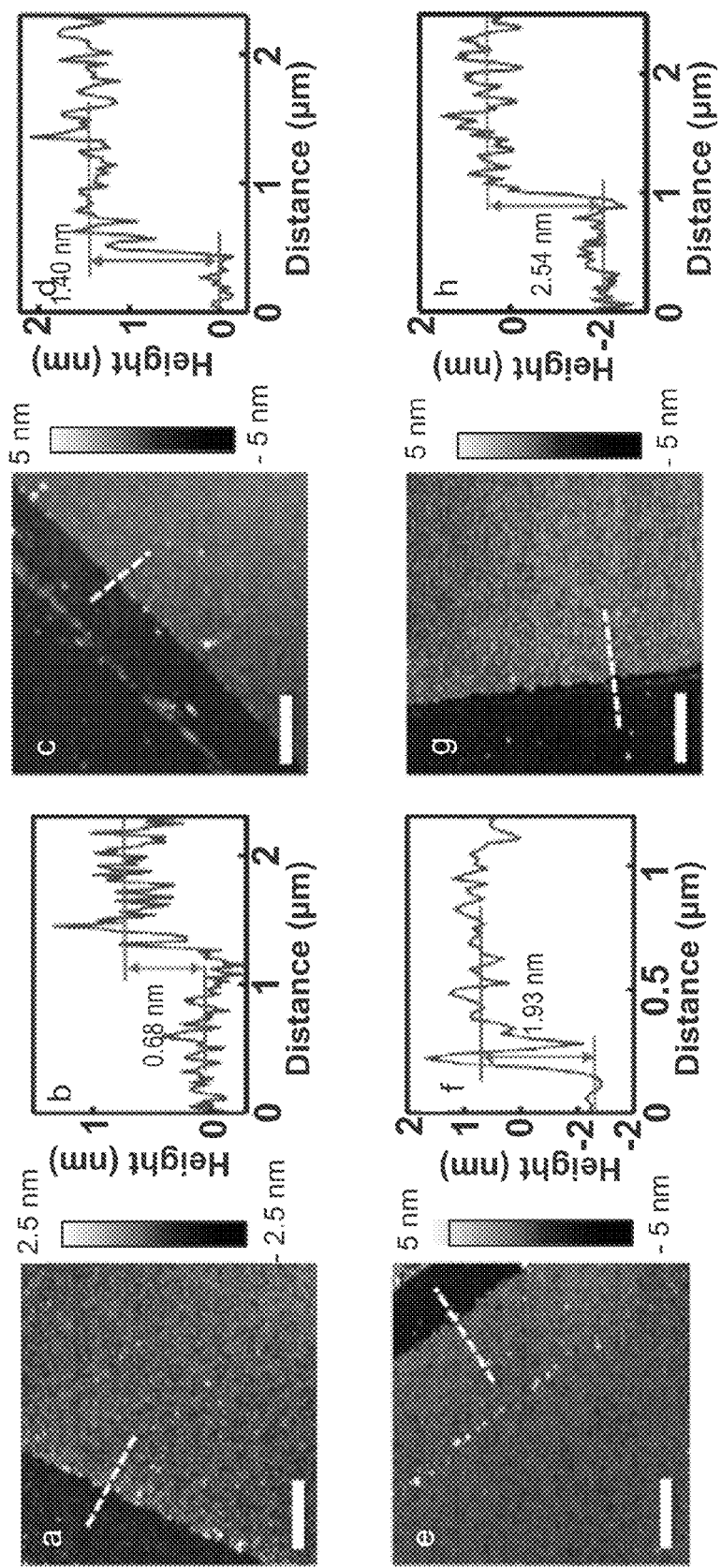

FIG. 22 AFM measurements of the MoS$_2$ thin films grown using different amounts of MoCl$_5$. (a, c, e, g) AFM images of MoS$_2$ thin films; (b, d, f, h) Height profile for the dashed lines given the corresponding AFM images.

Figure 23:
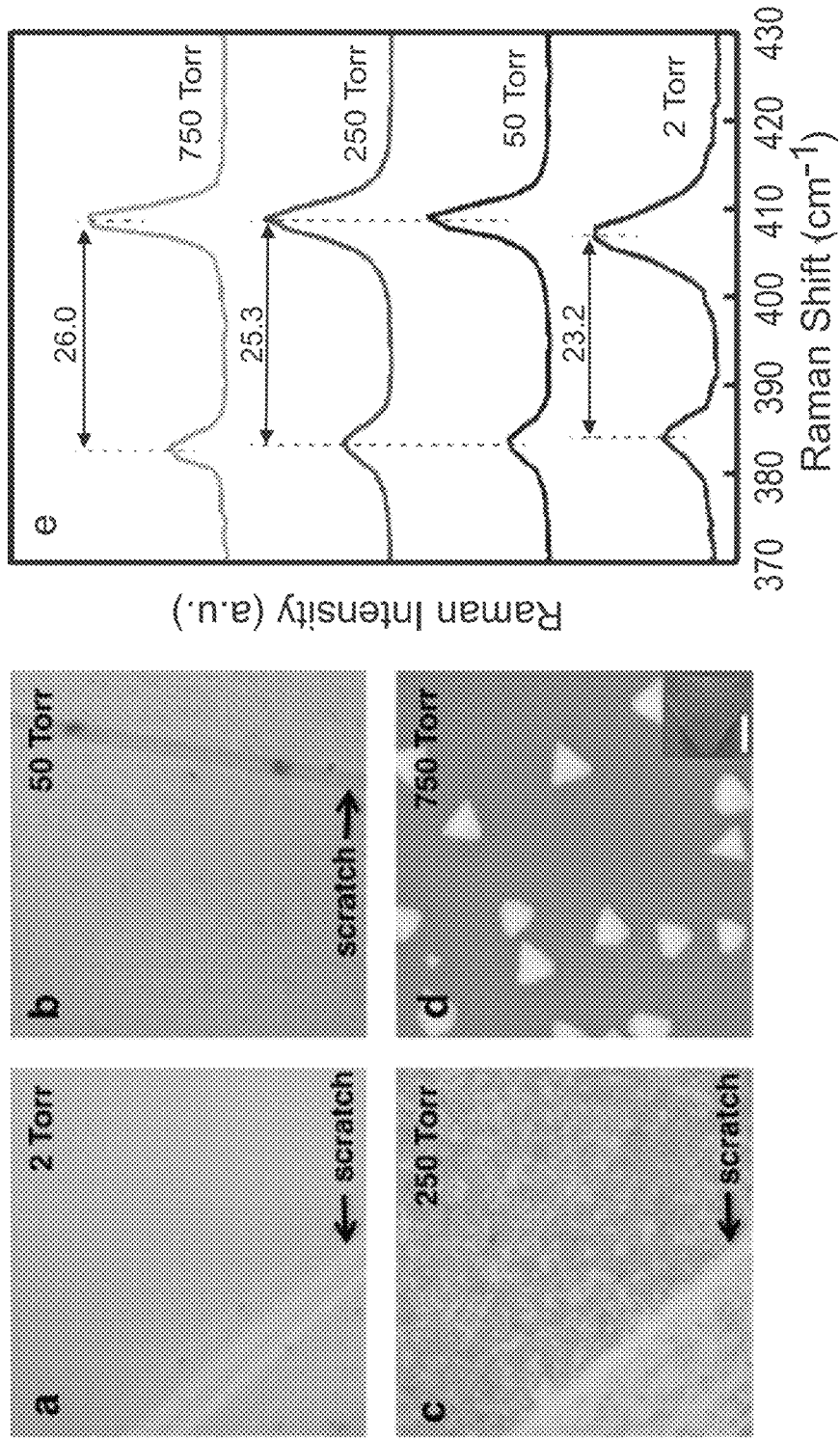

FIG. 23 MoS$_2$ materials grown under widely different total pressures. The amount of MoCl$_5$ used in these experiments is 15 mg. (a-d) Optical images of the MoS$_2$ materials grown with widely different total pressures, 2 Torr, 50 Torr, 250 Torr and 750 Torr. Scratches were introduced to show the contrast between the film and the substrate (SiO$_2$/Si). (e) Raman spectra of the MoS$_2$ thin films grown under different total pressures. The total pressure for each Raman spectra is labeled as shown. The Δk between E$_{2g}$ and A$_{1g}$ in the Raman spectra is also given in the figure.

Figure 24:
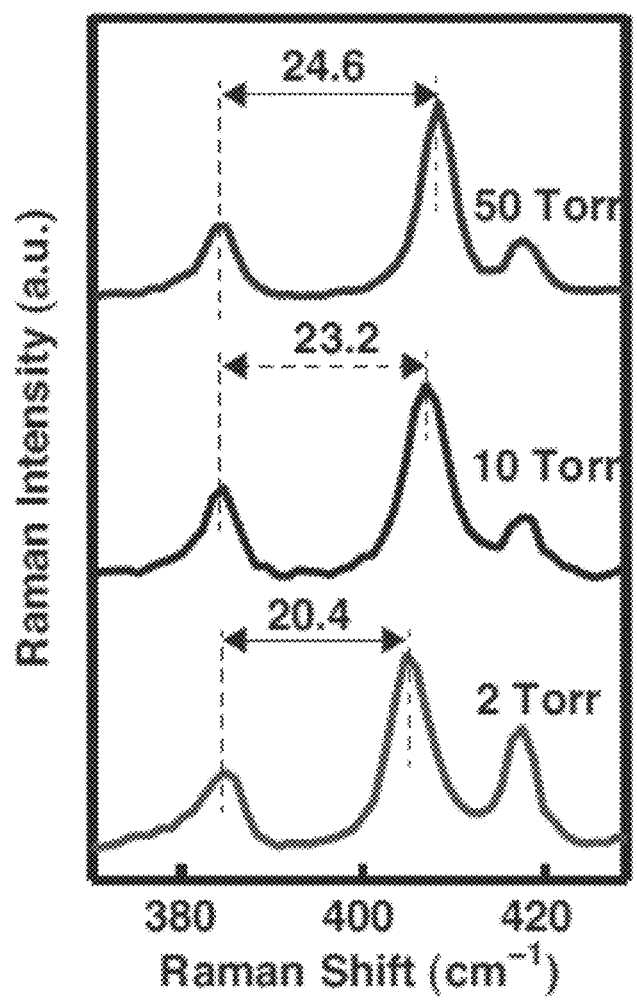

FIG. 24 Raman spectra of MoS$_2$ thin films grown under different total pressures. The amount of MoCl$_5$ used in these experiments is 4 mg. The total pressure for each of the Raman spectra is labeled as shown. The Δk for the Raman spectra is also given in the figure. We can see that the thickness of the resulting thin film increases with the total pressure.

Figure 25:
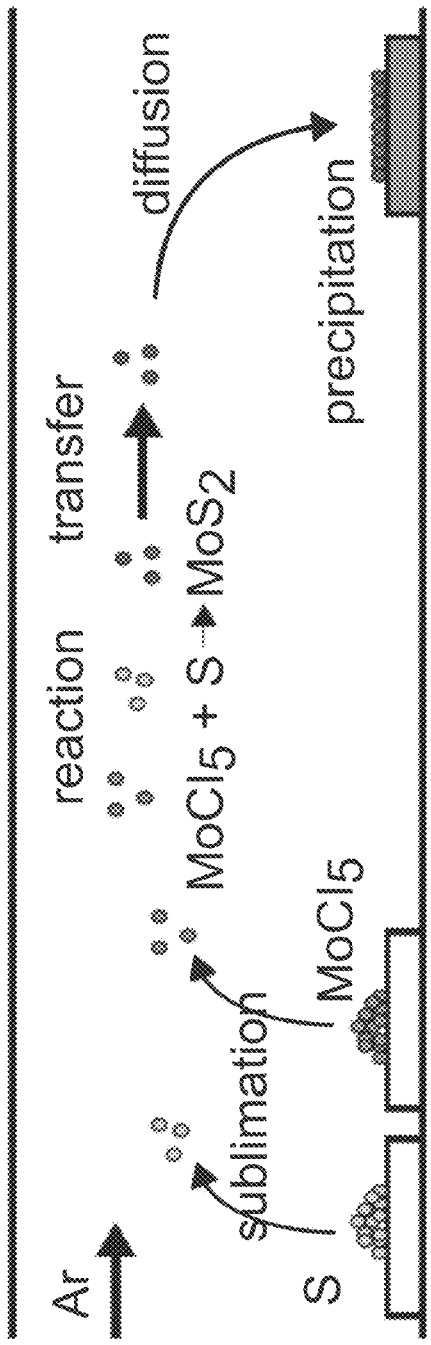

FIG. 25 Schematic illustration of the synthetic process, which includes five major steps: sublimation, reaction, transfer, diffusion and precipitation. Formulas for the partial pressure Mo are also shown.

Figure 26:
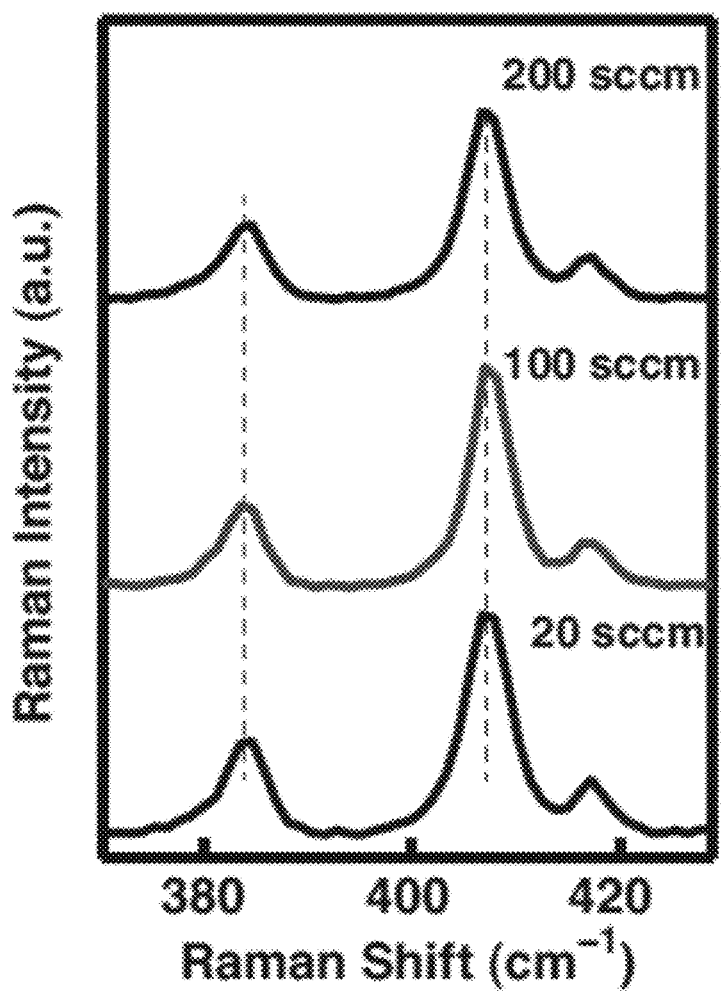

FIG. 26 Raman spectra for the MoS$_2$ thin films grown under different flow rates of carrier gas. The total pressure was maintained to be 5 Torr. The dashed lines indicate that the positions of E$_{2g}$ and A$_{1g}$ peaks remain identical regardless of flow rate.

Figure 27:
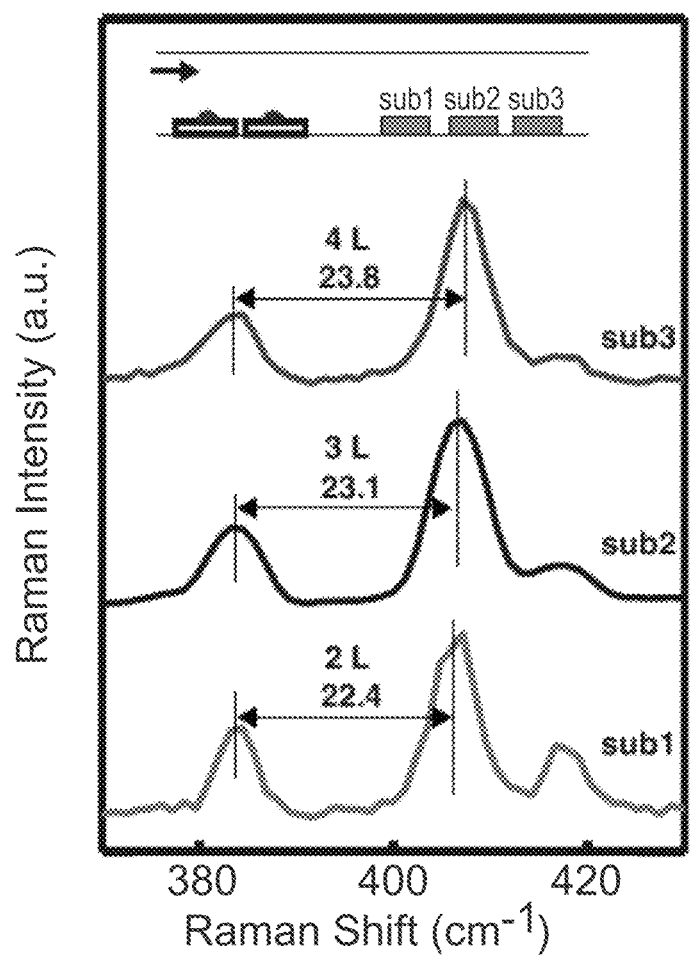

FIG. 27 Raman spectra of the MoS$_2$ thin films grown on receiving substrates with different temperatures. The inset shows a schematic illustration of the experimental configuration. The temperature for the substrates can be estimated as 850° C. (sub1), 750° C. (sub2), and 650° C. (sub3). The layer number and the Δk in the Raman spectra of the films grown on these substrates are given as shown.

Figure 28:
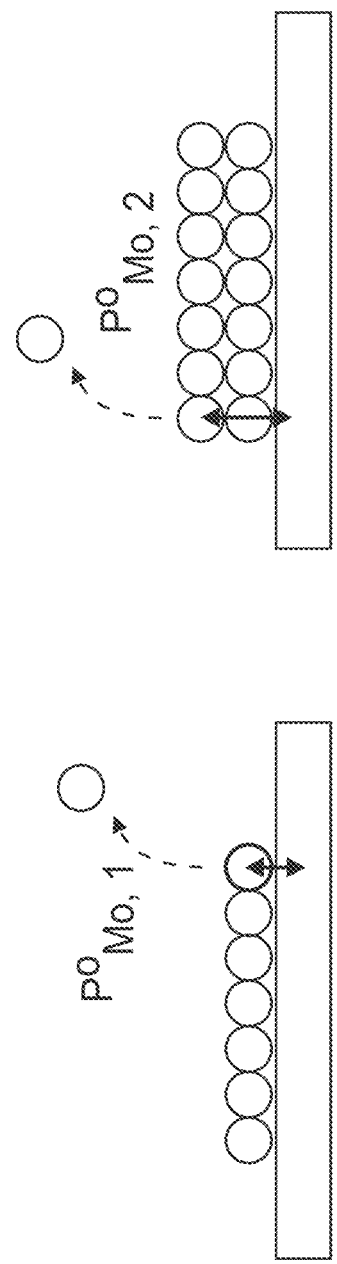

FIG. 28 Schematic illustration of the interaction between MoS$_2$ overlayers and receiving substrates. The double headed vertical arrows show the interaction of the overlayers with the substrate. The dashed arrows indicate the escape of atoms from the solid phase to the gas phase.

Figure 29:
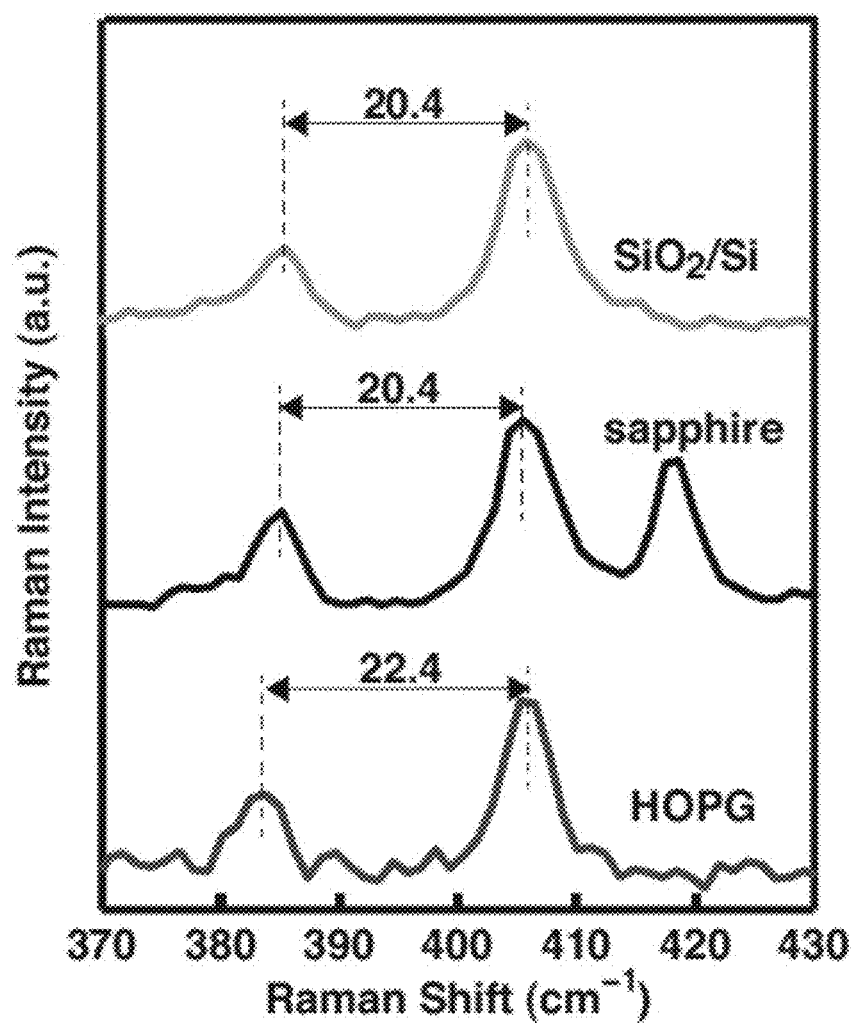

FIG. 29 Raman spectra of the MoS$_2$ thin films grown on different substrates. All experimental conditions for the growth on these substrates were kept identical. The Δk in the Raman spectra of the films grown on these differing substrates are given as shown.

5. DETAILED DESCRIPTION OF THE INVENTION

While the disclosure of the technology herein is presented with sufficient details to enable one skilled in this art to practice the invention, it is not intended to limit the scope of the disclosed technology. The inventors contemplate that future technologies may facilitate additional embodiments of the presently disclosed subject matter as claimed herein. Moreover, although the term "step" may be used herein to connote different aspects of methods employed, the term should not be interpreted as implying any particular order among or between various steps herein disclosed unless and except when the order of individual steps is explicitly described.

In research on synthesis of molybdenum sulfide ($MoS_2$) atomic thin films, structured materials have been developed and designed specifically for hydrogen evolution reaction (HER). Although $MoS_2$ atomic thin films have been previously developed, our process for developing the sheets is a cheaper and simpler method, and has been shown to be an effective catalyst when compared to platinum. Even under initial testing they have been shown to be relatively durable. We utilize a chemical vapor deposition (CVD) process to deposit the engineered structures on conductive substrates. The substrates are another key to our work. Previously, substrates such as silicon or silicon oxide have been used in relation to CVD. These substrates are relatively easy to deposit the structures on to, but they are not useful. Our process involves deposition on graphite substrates, one that is much more conductive and useful in a catalyst. In at least one embodiment, only two chemicals (sulfur and molybdenum chloride) are used in the production, along with the heat of the furnace, which is another example of our simplified process. To clarify, these electrocatalysts would be used for hydrogen generation. The hydrogen could then be used to generate energy in a proton exchange membrane cell.

Recent increased attention given to clean energy has raised many questions about how the alternatives would be economically viable compared to current methods of energy production. Current high quality hydrogen generation largely relies on the use of expensive platinum catalysts. Our cost efficient catalysts would bridge the gap for high quality hydrogen production, thus allowing increased development of all the benefits associated with hydrogen as a readily available fuel. What separates us will be the processes used to develop these materials. The processes will be able to be scaled up easily, allowing for a low cost of production in addition to the low cost of materials in the catalysts themselves.

Because our CVD process requires only three components (the chemical precursor, a furnace, and an inert gas flow) it would not be difficult to scale up for large scale production. In addition, only three materials are used (sulfur, molybdenum chloride ($MoCl_5$), and the graphite substrate) which are also much cheaper than current platinum substrates used. Other research already published details use of such compounds as cobalt oxide, which based on material price, are comparable to our catalysts. However, our CVD process is much simpler than current methods of hydrothermal generation and the use of self-assembled monolayers. Many of these processes require several reagents while ours requires only the initial materials and heat.

Utilizing our catalysts could potentially make large scale hydrogen production viable using electrolysis. For immediate application, these catalysts could be used to replace carbon platinum catalysts which are currently the only large scale method of producing hydrogen via electrolysis of water. In addition, by varying the conditions in our experiments, these $MoS_2$ atomic thin films can also be utilized in lithium ion batteries, and are effective photocatalysts which could be utilized in dye sensitized solar cells. Effective catalysts are also necessary for petroleum and natural gas processing, these materials can be used for hydrodesulfurization as well.

Regarding hydrogen evolution reaction and how a "good" catalyst is characterized, the hydrogen evolution reaction basically consists of two steps, absorption and desorption. The absorption occurs when the protons from the solution attach themselves to the electrode. The electrons on the electrode then combine with the protons to form a hydrogen atom, which then combines with another atom to form a hydrogen gas molecule. Desorption then takes place when the molecule leaves the electrode. The catalytic sites on the catalyst is key to this reaction taking place. We try to achieve a high number of sites for as small an area as possible in our samples.

The catalytic activity is quantified by two main criterion. The first is the exchange current. When aiming for a good catalyst, a large exchange current density is desired. The larger the exchange current in the solution, the more hydrogen will be evolved in that amount of time. Exchange current density can be explained by the rate of electron transfer between the analyte solution and the electrode. The second criterion that is oft used is the Tafel slope which is a calculated value based on the exchange current and the over potential. The over potential is based off the open circuit potential in a cell, which is basically the maximum potential that could be obtained in a cell. Any potential below that max open circuit potential is over potential. This is why platinum is considered the best catalyst, because it has an over potential of basically 0 which means it is operating at the maximum for the cell (or very close to the maximum). The Tafel slope is then calculated with a flat slope being ideal, but even platinum has a slope of around 30 mV/decade. A graph is shown below showing a Tafel slope.

Other research groups are aiming for a high exchange current density and a small Tafel slope. $MoS_2$ based catalysts, Molybdenum sulfides, efficient and viable materials for electro, and photoelectrocatalytic hydrogen evolution are being investigated. Amorphous molybdenum sulfide films as catalysts for electrochemical are being investigated.

Hydrogen production in water is being investigated. A two-step process (electrochemical then annealing) to produce films is being investigated. A Tafel slope of around 40 was perhaps achieved. Enhanced electrocatalytic activity for hydrogen evolution reaction from self-assembled monodispersed molybdenum sulfide nanoparticles on an Au electrode is being investigated.

Nanoparticles instead of films or sheets are being investigated. The process requires a long ultra sonification process however. In addition, although over potential and exchange current density were good, the Tafel slope was very large, which is not promising. A recent investigation relates to Hydrogen evolution catalyzed by $MoS_3$ and $MoS_2$ particles, with some focus on particle development. The process used is rather time consuming, though not very economically intensive. Tafel slopes generated were between 40 and 60.

According to embodiments described herein, Tafel slopes in the 30 s have been recorded and have an over potentials very close to 0 along with good current exchange density. In addition, the time to make a batch of catalysts has been reduced significantly.

Scalable Synthesis of Uniform, High-Quality Monolayer and Few-Layer $MoS_2$ Films Two dimensional (2D) materials with a monolayer of atoms represent an ultimate control of material dimension in the vertical direction. Molybdenum sulfide ($MoS_2$) monolayers, with a direct bandgap of 1.8 eV, offer an unprecedented prospect of miniaturizing semiconductor science and technology down to a truly atomic scale. Indications are toward the promise of 2D $MoS_2$ in fields including field effect transistors, low power switches, optoelectronics, and spintronics. However, device development with 2D $MoS_2$ has been delayed by the lack of capabilities to produce large-area, uniform, and high-quality $MoS_2$ monolayers.

In at least one embodiment, a self-limiting approach can grow high quality monolayer and few-layer $MoS_2$ films over an area of centimeters with unprecedented uniformity and controllability. This approach is compatible with a fabrication process in semiconductor manufacturing. It paves the way for the development of practical devices with 2D $MoS_2$ and opens up new avenues for fundamental research.

The significance of 2D materials has been manifested by a plethora of fascinating functionality demonstrated in graphene, a monolayer material of carbon atoms.[1,2] In contrast to graphene, which is a semi-metal with no bandgap by nature, $MoS_2$ monolayers offer an attractive semiconductor option due to a direct bandgap of 1.8 eV.[3,4] This non-trivial bandgap makes $MoS_2$ monolayers a better candidate than graphene to revolutionize many electronic and photonic devices that are currently dominated by traditional group IV or III-V semiconductor materials.[5-17] Considerable efforts have been dedicated to achieve scalable synthesis of high quality $MoS_2$ monolayers that is necessary for the development of practical devices. These include sulfurization of $MoO_3$ or Mo layers pre-deposited substrates, or thermolysis of Mo compound $(NH_4)2MoS_4$.[18-25] However, none of the existing processes is able to exclusively produce uniform $MoS_2$ monolayers over a large area, for instance, centimeters. $MoS_2$ monolayers resulted from these processes always co-exist with by-products of thicker layers. As the properties of $MoS_2$ materials strongly depend on the layer number, this material non-uniformity poses a formidable challenge for the improvement of device uniformity. Here we present a new, self-limiting CVD approach that can exclusively grow high-quality $MoS_2$ monolayer films over an area of centimeters on various substrates such as silicon oxide, sapphire, and graphite. The synthesized film shows unprecedented uniformity with no other layers found by thorough characterizations. It exhibits optical and electrical quality comparable to the $MoS_2$ exfoliated from bulk materials, and can be transferred to other arbitrary substrates. This approach also provides unprecedented controllability, allowing for the growth of few-layer $MoS_2$ films with precisely controlled layer numbers, such as bilayers, trilayers, and quadra-layers.

Unless defined otherwise, all technical and scientific terms used herein have the same meaning as commonly understood by one of ordinary skill in the art to which this invention belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The following Examples further illustrate the invention and are not intended to limit the scope of the invention. In particular, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

6. EXAMPLES

Results

FIG. 1—Controlled Synthesis of $MoS_2$ Monolayer and Bilayer Films:

(a and b) Optical images of the $MoS_2$ monolayer and bilayer films grown on sapphire substrates, respectively. The insets are optical images of the $MoS_2$ monolayer and bilayer films grown on $SiO_2$/Si substrates. The scale bars in the insets are 80 μm.

(c and d) AFM height profiles for typical $MoS_2$ monolayer and bilayer films grown on sapphire, respectively. The insets show the AFM images from which the height profiles are extracted.

(e) Raman spectra of the $MoS_2$ monolayer (1L) and bilayer (2L) films grown on sapphire. Also given are the Raman spectra of exfoliated $MoS_2$ monolayer and bulk $MoS_2$ dispersed on $SiO_2$/Si substrates. The two characteristic Raman modes are labeled. The peak at 418 $cm^{-1}$ is from the sapphire substrate.

We grew $MoS_2$ films at high temperatures (>800° C.) using $MoCl_5$ and sulfur as precursor materials. The precursor materials can react at elevated temperature to produce $MoS_2$ species, which may precipitate onto receiving substrates to yield $MoS_2$ films (FIG. 5). The layer number of the resulting $MoS_2$ films can be very precisely controlled by controlling the amount of $MoCl_5$ used in experiments or the total pressure in the synthetic setup. We have successfully grown the 2D $MoS_2$ on various substrates including silicon oxide, sapphire, as well as graphite. FIG. 1 (panel a-b) show optical images of the $MoS_2$ monolayer and bilayer films grown on sapphire substrates. The optical images of $MoS_2$ monolayer and bilayer films grown on silicon substrates with 280 nm thick silicon oxide ($SiO_2$/Si) are given as insets. Scratches were intentionally introduced to show the color contrast between the thin films and the substrates (no $MoS_2$ film exists in the scratched area). We confirm the chemical composition of the thin films is $MoS_2$ using x-ray photoelectron spectroscopy (XPS) characterizations (FIG. 6). From the optical images, we can find that the thin films are continuous and uniform over a large area. We can also find that the color contrasts of $MoS_2$ monolayer and bilayer films bear little difference on sapphire but are substantially different on SiO$_2$/Si, the monolayer showing pink color while the bilayer more bluish. This substantial difference in color contrast may provide a facile approach to determine the thickness of 2D MoS$_2$ materials.

We characterized the synthesized thin films using atomic force microscope (AFM) and Raman spectroscopy. The thickness of the synthesized MoS$_2$ monolayers and bilayers are shown 0.68 nm and 1.40 nm (FIG. 1 (panels c-d)), in consistence with exfoliated MoS$_2$ (FIG. 7 and FIG. 8). FIG. 1e shows the Raman spectra collected from the as-grown MoS$_2$ thin films on sapphire with different layer numbers (the Raman spectra for the MoS$_2$ films grown on SiO$_2$/Si is given in FIG. 10). The Raman spectra of exfoliated MoS$_2$ monolayers and bulk MoS$_2$ materials are also given in FIG. 1 (panel e) as references. Two characteristic Raman modes can be found in the spectra, the A$_{1g}$ mode associated with the out-of-plane vibration of sulfur atoms and the E$_{2g}$ mode related with the in-plane vibration of Mo and sulfur atoms.[26-28] The full width at half maximum (FWHM) of the E$_{2g}$ peak may be used as an indicator for crystalline quality. The E$_{2g}$ FWHM of the synthesized MoS$_2$ monolayer is 4.2 cm$^{-1}$, close to that of the exfoliated monolayer, 3.7 cm$^{-1}$. This suggests a good crystalline quality in the synthesized film. Additionally, the frequency difference (Δk) between the E$_{2g}$ and A$_{1g}$ modes has been known closely related with the layer number, and can be used to determine the thickness of MoS$_2$ materials.[26-28] We can find that the frequency difference Δk of the synthesized thin film increase with the thickness (FIG. 1 (panel e)), consistent with what were observed on exfoliated MoS$_2$.[26-28] The Δk of the synthesized films is generally larger than that of exfoliated MoS$_2$. For example, the Δk of the synthesized monolayer is found around 20.4 cm$^{-1}$, different from that of the exfoliated monolayer, 19.4 cm$^{-1}$. This could be related with certain crystalline imperfection, for example, smaller crystalline grains in the synthesized thin film. Other groups also observed a larger Δk in synthesized MoS$_2$ materials than exfoliated counterparts.[20]

FIG. 2—Large-Area Uniformity of the Synthesized MoS$_2$ Monolayer and Bilayer Films:

(panel a) A picture for as-grown MoS$_2$ monolayer (1L) and bilayer (2L) films, along with a NCSU logo. Underneath the films is a blank sapphire wafer, which is transparent and used as a reference.

(panel b) Raman spectra collected from eight different areas of the MoS$_2$ monolayer film. The inset schematically illustrates how the eight areas distribute across the substrate.

(panel c) Map of the Raman frequency difference Δk collected from an area of 10 μm×10 μm in the MoS$_2$ monolayer film. All the measured Δk are in the range of 20.3-20.7 cm$^{-1}$. Mapping step: 0.5 μm.

(panel d) Perspective view of a typical AFM image collected from the MoS$_2$ monolayer film.

The synthesized MoS$_2$ thin films show unprecedented uniformity. We can find the as-grown MoS$_2$ thin films continuous and uniform cross an area of centimeters under optical microscope or by eyes, as illustrated by FIG. 1 (panel a) and FIG. 2 (panel a). To more quantitatively assess the uniformity over a large area, we divided the monolayer MoS$_2$ film grown on a typical sapphire substrate in size of 1 cm×3 cm into eight areas (FIG. 2 (panel b) inset). We measured numerous Raman spectra at each of the areas, and plotted the typical results in FIG. 2 (panel b). We can find that the peak positions of the E$_{2g}$ and A$_{1g}$ modes remain identical between different areas. The profile of the Raman peaks, such as the FWHM, shows negligible difference. This indicates that the synthesized thin film is a homogeneous monolayer with similar crystalline quality across the entire substrate in length of centimeters. We also performed Raman mapping over an area of 10 μm×10 μm in the as-grown monolayer film, and plotted the measured frequency difference Δk in a 2D image (FIG. 2 (panel c)). All the Δk are found in a range of 20.3-20.7 cm$^{-1}$, confirming the film a homogeneous monolayer. To further confirm the uniformity, we performed multiple AFM measurements at different areas on the film, and found similar thickness and surface topology in all the AFM images (FIG. 11B). A typical AFM measurement (5 μm×5 μm) is given in FIG. 2 (panel d). It shows a continuous and smooth surface (roughness <0.2 nm) with no step and void observed. Similar uniformity can also be found at the synthesized bilayer MoS$_2$ film (FIG. 12-FIG. 13). We should note that the size of the synthesized thin films (1 cm×3 cm) is limited by the size and temperature uniformity of our current synthetic setup. We believe that by optimizing the synthetic setup we can produce wafer-scale MoS$_2$ monolayer or few-layer films.

FIG. 3—Characterization of the Crystal Structure of Synthesized MoS$_2$ Monolayer and Bilayer Films:

(panel a) High angle annular dark field (HAADF) image of typical MoS$_2$ monolayer film. Upper inset is the corresponding FFT pattern, which is not indexed for visual convenience (an indexed version is given in FIG. 15 (panel a). Lower inset shows the folded edges of MoS$_2$ monolayer and bilayer films. The lattice constant and important crystalline directions are given as shown.

(panels b and c) HAADF of MoS$_2$ monolayer and bilayer films. The image of the bilayer film (panel c) is FFT-filtered and the original version is given in FIG. 15 (panel b). The insets show modeled crystal structures of MoS$_2$ monolayer and bilayer films with blue and yellow dots corresponding to Mo and S atoms, respectively. The sulfur atom in the inset of (panel c) is not given for visual convenience. The scale bars are 1 nm.

The synthesized MoS$_2$ films exhibit a very good crystalline quality as indicted by the Raman measurements (FIG. 1 (panel e) and FIG. 2 (panel b)). To further elucidate the crystalline structure, we characterized the thin film using aberration-corrected scanning transmission electron microscope (STEM). To do that, we transferred the synthesized film to TEM grids following a process reported in references.[19] The synthesized film is found as polycrystalline with crystalline grains varying from tens to hundreds of nanometers as indicated by selected area electron diffraction patterns (FIG. 14). We used high angle annular dark field (HAADF) imaging to investigate the atomic arrangement in the synthesized MoS$_2$ monolayer and bilayer films. The monolayer and the bilayer can be identified from the folding edge of the transferred thin film (FIG. 3 (panel a inset)). FIG. 3 (panel a) shows typical STEM high angle annular dark field (HAADF) image and corresponding fast Fourier transformation (FFT) pattern of synthesized monolayers. The hexagonal atomic arrangement shown in the STEM image and the FFT pattern indicate that the basal plane of the synthesized thin film is (001), i.e. the c-axis of MoS$_2$ materials perpendicular to the thin film. From the STEM image we can directly measure the lattice constant as a=b=0.32 nm, consistent with bulk MoS$_2$ materials. As STEM-HAADF imaging is dependent on the atomic number, we can identify the positions of Mo and S atoms in the monolayer by the difference in image contrast (Mo atoms show much higher contrast than S atoms), as shown in FIG. 3 (panel b). Additionally, STEM-HAADF imaging provides a credible way to identify the stacking sequence in MoS$_2$ bilayers. We can find substantial difference between the images of MoS$_2$ monolayer (FIG. 3 (panel b)) and bilayer (FIG. 3 (panel c)). This difference indicates an AB stacking sequence in the MoS$_2$ bilayer, where the Mo atoms of one layer overlap with the position of the sulfur atoms in the other layer, typically referred as 2H—MoS$_2$ (FIG. 16). The experimental observation matches the modeled image for the AB stacking very well (FIG. 3 (panel c)).

FIG. 4—Optical and Electrical Characterizations of the Synthesized MoS$_2$ Monolayer Films:

(panel a) Photoluminescence (PL) of the synthesized and exfoliated MoS$_2$ monolayers. Both were dispersed on SiO$_2$/Si substrates. The synthesized monolayer was grown on sapphire substrates and then transferred to SiO$_2$/Si substrates for the PL measurement. Inset is PL mapping of an as-grown MoS$_2$ monolayer on sapphire substrates with the color representing normalized PL intensity at 665 nm as illustrated by the color bar.

(panel b) $I_{ds}$-$V_{ds}$ curve for a field effect transistor (FET) made with the synthesized MoS$_2$ monolayer with gating voltages $V_{gs}$ 0, 10, 20, 40 V. Inset, transfer characteristic for the FET with a source drain bias $V_{ds}$ of 2 V.

The synthesized thin films show excellent optical quality that is comparable to exfoliated MoS$_2$. FIG. 4 (panel a) shows the PL spectra collected from exfoliated and synthesized MoS$_2$ monolayers. Raman peaks of the MoS$_2$ materials are also included, and the PL spectra are normalized to the intensity of corresponding Raman peaks. The normalization is to better correlate the measured PL intensity with the intrinsic luminescence efficiency of the materials.[4] Two peaks can be found in the PL spectra, ~620 nm and ~670 nm, and can be correlated to the B1 and A1 excitons of MoS$_2$, respectively.[4] We can find similar PL peaks from both synthesized and exfoliated MoS$_2$ monolayer. This suggests a comparable optical quality in the synthesized film with the exfoliated MoS$_2$. We should note that the synthesized monolayer was grown on sapphire substrates. For the convenience of comparison with the exfoliated materials that were dispersed onto SiO$_2$/Si substrates, the synthesized monolayer was transferred to SiO$_2$/Si substrates for the PL measurement (see the effect of substrates on PL in FIG. 17). We find that the PL from the MoS$_2$ monolayer film grown on SiO$_2$/Si substrates is much weaker than the films grown on sapphire (FIG. 18), probably due to a poorer crystalline quality in the films grown on SiO$_2$/Si substrates than those grown on sapphire as reported previously.[19] Additionally, the PL efficiency of exfoliated MoS$_2$ has been well known substantially decreasing with the increase in the layer number due to an evolution of the bandgap with the layer number. We can find that the PL efficiency of the synthesized MoS$_2$ bilayer is indeed substantially smaller than that of synthesized monolayers (FIG. 19). This suggests that the bandgap of the synthetic MoS$_2$ film bears a similar dependence on the layer number as the exfoliated MoS$_2$. To illustrate the uniformity of the optical quality, we performed PL mapping over an area of 20 μm×20 μm in the synthesized monolayer. The measurement demonstrates a uniform distribution in the PL intensity (FIG. 4 (panel a inset)), confirming the uniformity as suggested by the Raman measurements shown in the preceding text.

We also evaluated the electrical quality of the synthesized MoS$_2$ monolayer film. We transferred the thin film grown on sapphire to degenerately doped silicon substrates covered with 230-nm-thick SiO$_2$, and fabricated bottom-gate transistors by evaporating 5 nm Ti/50 nm Au electrodes on top of the MoS$_2$ thin film. We performed electrical measurements at room temperature and in ambient environment using the degenerately doped silicon substrate as the gate and deposited Au electrodes as the source and drain. FIG. 4 (panel b) shows typical output characteristic and transfer characteristic (inset) curves of the device. These results indicate that the device is an n-type channel field effect transistor, consistent with other works on exfoliated ones.[5,29,30] The linear dependence of the current on the source-drain bias $V_{ds}$ suggests that the contacts between the MoS$_2$ thin film and the electrodes are ohmic. This ensures that the observed field effect behavior is from the monolayer MoS$_2$ channel rather than Schottky barriers at the contact. From the measurements, we can derive the field-effect mobility of charge carriers in the device as 0.003-0.03 cm$^2$/V.S. This is reasonably comparable to previous reports on exfoliated monolayers measured in similar conditions (ambient environment, back gating with silicon oxide as the gate oxide).[5,29,30] We can thus conclude that the synthesized thin film has a reasonably comparable electrical quality with exfoliated MoS$_2$.

Discussions

The observed remarkable uniformity and controllability in the synthesized MoS$_2$ film strongly suggests that this synthetic process is self-limiting. Unlike the self-limiting mechanism for the growth of graphene,[31] which is related with the limited solubility of carbon source in the catalyst, our experimental results suggest that the partial pressure of gaseous MoS$_2$ species and the interaction of MoS$_2$ thin films with the substrate play key roles in this self-limiting mechanism.

We found in experiments that the layer number of the MoS$_2$ thin film increases with the amount of precursor materials (FIG. 20, FIG. 21, FIG. 22) and the total pressure in the synthetic setup (FIG. 23-FIG. 25). Our analysis of the growth dynamics indicates that this can essentially be correlated to the partial pressure of gaseous MoS$_2$ species $P_{Mo}$. The partial pressure $P_{Mo}$ increases with the amount of precursor materials and the total pressure, and higher partial pressures can results in larger layer numbers in the synthesized thin film (FIG. 25-FIG. 26). We also found that the layer number is dependent on the receiving substrate, including its temperature and type of materials (FIG. 27-FIG. 29). For instance, with comparable experimental conditions, the film grown on sapphire is monolayer, but the one grown on highly ordered pyrolytic graphite (HOPG), which has similar layered structure as MoS$_2$, is bilayer. This can be ascribed to the vapor pressure of MoS$_2$ thin films $P°_{Mo}$. The vapor pressure $P°_{Mo}$ increases with temperature and can be affected by the interaction of MoS$_2$ thin films with the substrate.

These experimental results suggest that the relative amplitude between the partial pressure of gaseous MoS$_2$ species $P_{Mo}$ and the vapor pressure of MoS$_2$ thin films $P°_{Mo}$ determine the layer number of the synthesized thin film. Vapor pressure indicates a capability of atoms escaping from a solid phase into a gas phase. The van der Waals (attractive) interaction of MoS$_2$ overlayers with the substrate may suppress the escaping of MoS$_2$ atoms, and subsequently cause a decrease in the vapor pressure. Similar suppression effects of the interaction with substrates on the vapor pressure of overlayers has been documented with other materials, for instance, polymers.[32] Because the interaction of the outmost MoS$_2$ layer with the substrate decays with the overall thickness of the film increasing, the vapor pressure of MoS$_2$ thin films may increase with the layer number (FIG. 24). This layer-dependent vapor pressure of MoS$_2$ thin films offers the possibility to precisely control the layer number. For instance, by controlling the partial pressure $_{PMo}$ in the middle of the vapor pressures of $MoS_2$ monolayer ($P°_{Mo,1}$) and bilayer ($P°_{Mo,2}$) films as $P°_{Mo,1}<P_{Mo}<P°_{Mo,2}$ could result in an exclusive growth of $MoS_2$ monolayers on the substrate. In this case, the larger vapor pressure of $MoS_2$ bilayers would automatically prevent the continuous growth once a $MoS_2$ monolayer film is formed, regardless continuous supply of $MoS_2$ species. The observed different layer numbers in the film grown on HOPG and sapphire confirms the role of the interaction with the substrate in the growth (FIG. 29).

In conclusion, we demonstrate a new chemical vapor deposition approach that can provide capabilities to produce large-area, high quality $MoS_2$ monolayer and few-layer films with unprecedented uniformity. Our experimental results strongly suggest that this synthetic process is self-limiting dictated by the balance between the equilibrium pressure of $MoS_2$ thin films and the partial pressure of $MoS_2$ species in the vapor phase. As a final note, this synthetic approach can be readily scaled up to produce wafer-scale 2D $MoS_2$ for the development of practical electronic and photonic devices. It is poised to enable 2D $MoS_2$ as a useful functional material to revolutionize a wide range of fields including information technology, optoelectronics, chemical/biological sensing, and spintronics.

Methods $MoS_2$ thin films were synthesized in a tube furnace as illustrated in FIG. 5. In a typical growth, 4-20 mg of molybdenum chloride ($MoCl_5$) powder (99.99%, Sigma-Aldrich) was placed at the center of the furnace and 1 g of sulfur powder (Sigma-Aldrich) were placed at the upstream entry of the furnace. Receiving substrates were placed downstream. Typical conditions for high-quality $MoS_2$ thin film growth include a temperature of 850° C. a flow rate of 50 sccm, and a pressure around 2 Torr. The layer number of the synthetic $MoS_2$ thin film can be controlled by control of the amount of $MoCl_5$ precursor or the total pressure in the synthetic setup.

The crystal structure of the resulting products were analyzed with transmission electron microscope (TEM, JEOL-2010) and aberration-corrected scanning transmission electron microscope (STEM, FEI Titan 80-300 STEM) with probe $C_s$ corrector operated as 200 KV under STEM mode. The as-grown thin film was transferred to TEM grid for the structure characterization. The thickness and surface topology were measured using atomic force microscope (AFM, Veeco Dimension-3000). Raman mapping and photoluminescence (PL) measurements were carried out using Horiba Labram HR800 Raman Microscopy with an excitation wavelength of 532 nm. X-ray photoelectron spectroscopy were performed on SPECS XPS using an Mg Kα x ray source. The field-effect transistor device was fabricated by evaporating Ti/Au (5/200 nm) electrodes directly onto top of $MoS_2$ films transferred to degenerately doped Si substrates with 230 nm thick silicon oxide. A copper grid (100 mesh, 30 micron spacing, Ted Pella) was placed on the top of the thin film as mask for the electrode fabrication. This gives a relative large channel with a length L=30 µm and a width W=230 µm. The electrical measurements were performed in ambient conditions using a probe station (Karl Suss PSM6)

Scalable Synthesis of Uniform, High-Quality Monolayer and Few-Layer $MoS_2$

Films

Studies of the Growth Mechanism

See FIGS. 5-19 and brief descriptions.

The observed remarkable uniformity and controllability in the synthesized $MoS_2$ film suggests that this synthetic process is self-limiting. We found in experiments that the layer number of the $MoS_2$ thin film depended on the amount of precursor materials, the total pressure in the synthetic setup, and the receiving substrate (i.e. the temperature and material of the substrate). These experimental results suggest that the partial pressure of gaseous $MoS_2$ species and the interaction of $MoS_2$ thin films with the receiving substrate play key roles in this self-limiting mechanism. It is different from the self-limiting mechanism reported for the growth of graphene, which is related with the limited solubility of carbon source in the catalyst of copper.[33]

We found that the layer number of resulting $MoS_2$ thin films shown dependence on the amount of $MoCl_5$ used in experiments. A larger amount of $MoCl_5$ generally yields thicker films. With typical experimental conditions, using 1-4 mg $MoCl_5$ gives rise to $MoS_2$ monolayers, 5-10 mg for $MoS_2$ bilayers, 11-15 mg for $MoS_2$ trilayers, and 16-25 mg for quadra-layers (FIG. 20-21). We cannot see substantial deposition of $MoS_2$ when the amount of $MoCl_5$ is decreased down to less than 1 mg. And the precise control of the layer number tends to be more difficult for thicker films. FIG. 20 lists the correlation between the amount of $MoCl_5$ used in experiments and the lay number of resulting $MoS_2$ thin films. Also listed is the frequency difference Δk between the $A_{1g}$ and $E_{2g}$ peaks in the Raman spectra of these thin films. See FIG. 20.

The growth of $MoS_2$ thin films was also found dependent on the total pressure in the synthetic setup. Typically, higher pressures give rise to larger thickness. FIG. 23 shows the optical images and Raman spectra of $MoS_2$ structures grown under widely different total pressures. The amount of $MoCl_5$ used in all these experiments was kept identical (15 mg). We can see that the $MoS_2$ thin film grown at a total pressure of 2 Torr shows bluish in color and has 3 layers with a Δk of 23.2 $cm^{-1}$ in the Raman spectrum. In contrast, the thin film grown at 50 Torr is green and has a larger Δk of 25.3 $cm^{-1}$ that is similar to that of bulk $MoS_2$ materials. This indicates a substantial larger thickness in the film grown at 50 Torr than the one grown at 2 Torr. An even larger total pressure can give rise to a growth of bulky structure such as triangular plates (FIG. 23(panel d)). The thickness of the triangular plates is measured as ~100-200 nm. FIG. 24 gives another example to illustrate the effect of the total pressure on the growth. In these experiments, the amount of $MoCl_5$ used in these experiments was 4 mg, and we used different total pressures but kept all other conditions comparable. We can find that the Δk of the resulting thin film increases from 20.4 $cm^{-1}$ at 2 Torr to 23.2 $cm^{-1}$ at 10 Torr and further 24.6 $cm^{-1}$ at 50 Torr. Again, this indicates that the layer number of the $MoS_2$ thin film increases with the total pressure.

The effects of the amount of $MoCl_5$ precursor and the total pressure on the layer number of the synthesized $MoS_2$ thin film can be essentially correlated to their effects on the partial pressure of gaseous $MoS_2$ species. To illustrate this notion, we examined the synthetic process (FIG. 25). The synthetic process includes five major steps: 1) sublimation of sulfur and $MoCl_5$; 2) reaction of $MoCl_5$ and S to produce gaseous $MoS_2$ species; 3) transfer of the $MoS_2$ species downstream by carrier gas; 4) diffusion of $MoS_2$ species from the gas phase onto receiving substrates; and 5) precipitation of $MoS_2$ on the substrates. The precursor of $MoCl_5$ may react with sulfur at high temperature to give rise to $MoS_2$. In experiments, we use excessive amount of sulfur (the molar ratio of sulfur and $MoCl_5$ is >1000:1) to ensure the vapor of S far bigger than that of $MoCl_5$. As a result, we can reasonably assume that the reaction of $MoCl_5$ is complete.

With the assumption of the full reaction of $MoCl_5$ vapor, the partial pressure of $MoS_2$, $P_{Mo}$, depends on the sublimation rate (molar loss rate per unit surface area) of sulfur $\Phi_S$ and MoCl$_5$, $\Phi_{Mo}$, the flow rate of carrier gas Ar, $J_{Ar}$ (mol/s), and the total pressure P$_{total}$ in the synthetic setup as equation FIG. 25 (S1).

A$_{Mo}$ and As are the surface area of the precursor materials MoCl$_5$ and sulfur, respectively, which increases with the amount of precursor powder. The sublimation rate depends on the T of the precursor materials, and the difference between the equilibrium vapor pressure $_{Pvap}$ of precursor materials and the partial pressure $_{Ppar}$ of these materials in vapor, $\Phi=(P_{vap}-P_{par})/(2\pi MRT)^{0.5}$, where M is the molecular weight of the materials, and R is the molar gas constant. With the typical conditions used in experiments (T~300° C., the weight of sulfur: 1 g, the particle size in sulfur par 0.1 mm), we can estimate that the sublimation flux of sulfur powder is around 0.015 mol/s. This is much larger than the typical flux (50 sccm) of carrier gas, $J_{Ar}$~0.0001 mol/s. By the same token, we can also conclude that the sublimation flux of sulfur is orders of magnitude larger than that of MoCl$_5$. Therefore, during the synthesis period, eq. (FIG. 25 S1) can be further simplified as equation (FIG. 25 S2).

From eq. (S2), we can see that the partial pressure of MoS$_2$ (P$_{Mo}$) increases with the amount of MoCl$_5$ precursor (increasing A$_{Mo}$) and the total pressure P$_{total}$. This correlation, along with the observed effects of the amount of MoCl$_5$ precursor and the total pressure on the growth, strongly suggest that the partial pressure of MoS$_2$ species plays a key role in determining the layer number of the synthesized MoS$_2$ thin film. A larger partial pressure of gaseous MoS$_2$ species may give rise to MoS$_2$ films with larger layer numbers. As corroborating evidence for this analysis, we observed that the flow rate of carrier gas bears negligible effects on the layer number of the MoS$_2$ films. FIG. 26 shows the Raman spectra collected from the MoS$_2$ thin films grown with different flow rates of carrier gas (Ar). We can find that the layer number of the thin films remains unchanged regardless a dramatic variation in the flow rate by one order of magnitude. This confirms that, due to the dominance of the sublimation flux of sulfur, the flow rate of carrier gas only has negligible effects on the partial pressure of MoS$_2$ species. With this said, it also confirms that the partial pressure of MoS$_2$ is a key parameter to determine the layer number.

To better understand the dependence of the layer number on the partial pressure of MoS$_2$, we examine the precipitation reaction,

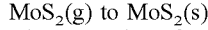
MoS$_2$(g) to MoS$_2$(s)

where g and s refer to gaseous and solid phases, respectively. This precipitation reaction is governed by two pressures, the partial pressure of the gaseous species and the equilibrium vapor pressure (or referred as vapor pressure) of the material in solid phase. It has been well known that a supersaturation of the gaseous species is the thermodynamics driving force for precipitation reactions in CVD processes. In another word, to drive this precipitation reaction, the partial pressure of the MoS$_2$ species (P$_{Mo}$) in the vapor phase must be larger than the vapor pressure of MoS$_2$ thin films (P$^o_{Mo}$) on the substrate, P$_{Mo}$>P$^o_{Mo}$. Essentially, it is the relative amplitude of the partial pressure P$_{Mo}$ and the vapor pressure P$^o_{Mo}$ that decides the layer number of the synthesized MoS$_2$ thin film. This can be elucidated by our experimental observation on the dependence of the layer number on the temperature of the receiving substrates. As illustrated in the FIG. 21 inset, we placed three receiving substrates in the synthetic setup, and examined the layer number of the MoS$_2$ thin film grown on these substrates. These substrates had different local temperatures, 850° C., 750° C., and 650° C. for the substrate 1 (referred as sub1 in FIG. 27 inset), substrate 2, and substrate 3, respectively. We can find that the layer number of the thin film increases with the temperature of receiving substrates decreasing. In this experiment, the partial pressure $_{PMo}$ can be reasonably assumed identical for these three substrates, but the vapor pressure of MoS$_2$ thin films $_{PoMo}$ exponentially decreases with the temperature. The experimental observation indicates that a larger supersaturation (P$_{Mo}$-P$^o_{Mo}$) tends to give rise to larger layer numbers.

In CVD processes, a larger supersatuation may drive the gaseous species to precipitate faster. However, we do not think that the precipitation rate would be the major reason for the observed precise control in the layer number of the synthesized MoS$_2$ thin films. Should the precipitation rate be the major control mechanism, it would be extremely difficult to produce large-area, uniform MoS$_2$ films with layer number precisely controlled to be 1, 2, 3, or more. This would request a perfect timing in controlling the precipitation to stop right at the end of the formation of each individual layer, which would be impossible in our synthetic setup. The growth of large-area, highly uniform MoS$_2$ thin films in our experiments suggests that this precipitation is a self-limiting process, i.e. the precipitation may automatically stop at the end of the formation of each individual layer.

We believe that the self-limiting mechanism may lie in a balance between the partial pressure of gaseous MoS$_2$ species P$_{Mo}$ and the vapor pressure of MoS$_2$ thin films (P$^o_{Mo}$) on the substrate. The vapor pressure of MoS$_2$ thin films could increase with the layer number. Therefore, the precipitation of gaseous MoS$_2$ species may be automatically stopped at a specific layer number if the P$^o_{Mo}$ of MoS$_2$ thin films would be made larger than P$_{Mo}$ should one more layer be added. For instance, the exclusive growth of MoS$_2$ monolayer could be achieved by controlling the partial pressure $_{PMo}$ in the middle of the vapor pressures of MoS$_2$ monolayer (P$^o_{Mo,1}$) and bilayer (P$^o_{Mo,2}$) films as P$^o_{Mo,1}$<P$_{Mo}$<P$^o_{Mo,2}$. In this case, the larger vapor pressure of MoS$_2$ bilayers may automatically prevent the continuous growth once a MoS$_2$ monolayer film is formed, regardless continuous supply of MoS$_2$ species. Additionally, the vapor pressure of the MoS$_2$ thin film P$^o_{Mo}$ may increases with the temperature. For instance, the vapor pressure of MoS$_2$ trilayer films P$^o_{Mo,3}$ at 750° C. might be similar to that of MoS$_2$ bilayer films P$^o_{Mo,2}$ at 850° C. (the vapor pressure increases with either the temperature or the layer number increasing). Therefore, the same partial pressure of gaseous MoS$_2$ may give rise to the growth of thicker films at lower temperature.

The dependence of the vapor pressure of MoS$_2$ thin films on the layer number may be caused by the interaction with substrates, as illustrated in FIG. 28. The vapor pressure indicates a capability of atoms escaping from the solid phase into the gas phase. However, the van der Waals (attractive) interaction of MoS$_2$ overlayers with the substrate may substantially suppress the escaping of MoS$_2$ atoms. This can subsequently cause a decrease in the vapor pressure. Additionally, this interaction is expected to quickly decrease with an increase in the layer number, and the atoms in thicker MoS$_2$ films would be able to escape into the gas phase more easily. As a result, the vapor pressure of MoS$_2$ thin film may increase with the layer number. For instance, the vapor pressure of MoS$_2$ monolayer films (P$^o_{Mo,1}$) may be smaller than that of MoS$_2$ bilayer films (P$^o_{Mo,2}$), and the vapor pressure of MoS$_2$ bilayer films (P$^o_{Mo,2}$) may be smaller than that of MoS$_2$ trilayer films (P$^o_{Mo,3}$), P$^o_{Mo,1}$<P$^o_{Mo,2}$<P$^o_{Mo,3}$. The difference between the vapor pressures of MoS$_2$ films with neighboring layer number ($P^o_{Mo,n+1} - P^o_{Mo,n}$, n refers to the layer number) may decrease with the layer number because the interaction with the substrate quickly decays with the layer number. This is indeed consistent with our experimental observations that a precise control of the layer number tends to be more difficult for thicker films, often resulting a mixture of layer numbers. Similar suppression effects of substrates on the vapor pressure have been well demonstrated in other materials adsorbed on substrates, for instance, polymers.[34]

To further examine this self-limiting mechanism, we studied the growth on different receiving substrates. In experiments we used two types of receiving substrates. One is the traditional three-dimensional (3D) bonded materials such as silicon oxide and sapphire (referred as 3D substrates), the other is highly ordered pyrolytic graphite (HOPG) that has a similar layered structure as $MoS_2$ (referred as 2D substrates). We grow $MoS_2$ films on these different substrates under identical experimental conditions (the different substrates were placed side by side in the tube furnace). No difference has been found in the layer number between the $MoS_2$ films grown on sapphire and those grown on silicon oxide substrates. However, we can find a substantial difference between the films grown on sapphire and HOPG (from Ted Pella) as shown in FIG. 29. For example, we can find that, with the same experimental conditions, while the film grown on sapphire or $SiO_2$/Si substrate is monolayer ($\Delta k$ 20.4 $cm^{-1}$), the one grown on HOPG is bilayer ($\Delta k$ 22.4 $cm^{-1}$).

This result confirms that the interaction of $MoS_2$ overlayers with the substrate plays an important role in the self-limiting growth. Dictated by the nature of layered structures, there is no dangling bond at the surface of $MoS_2$ overlayers. Therefore, the interaction between the $MoS_2$ overlayer and substrates is always van del Waals forces. However, the strength of the van del Waals force with conventional 3D substrates e.g. sapphire, is well known different from that with 2D substrates (such as HOPG). This difference has been extensively manifested by the van del Waals epitaxy growth of layered materials on 2D substrates. The van der Waals interaction between layer material overlayers and layered materials substrate may be strong enough to ensure the growth of the overlayer following the lattice of underlying substrates. In our experiment, the different interactions of the $MoS_2$ overlyer with sapphire and HOPG may cause different vapor pressures of $MoS_2$ thin films. Therefore, the same partial pressure of $MoS_2$ can give rise to a growth of thicker $MoS_2$ film on HOPG.

7. REFERENCES

1 Novoselov, K. S. et al. Two-dimensional gas of massless Dirac fermions in graphene. *Nature* 438, 197-200, (2005).
2 Berger, C. et al. Electronic confinement and coherence in patterned epitaxial graphene. *Science* 312, 1191-1196, (2006).
3 Mak, K. F., Lee, C., Hone, J., Shan, J. & Heinz, T. F. Atomically Thin $MoS_2$: A New Direct-Gap Semiconductor. *Phys Rev Lett* 105, (2010).
4 Splendiani, A. et al. Emerging Photoluminescence in Monolayer $MoS_2$. *Nano Lett.* 10, 1271-1275, (2010).
5 Radisavljevic, B., Radenovic, A., Brivio, J., Giacometti, V. & Kis, A. Single-layer MoS2 Transistors. *Nat Nanotechnol* 6, 147-150, (2011).
6 Wang, H. et al. Integrated Circuits Based on Bilayer $MoS_2$ Transistors. *Nano Lett.* 12, 4674-4680, (2012).
7 Yin, Z. Y. et al. Single-Layer $MoS_2$ Phototransistors. *Acs Nano* 6, 74-80, (2012).
8 Pu, J. et al. Highly Flexible $MoS_2$ Thin-Film Transistors with Ion Gel Dielectrics. *Nano Lett* 12, 4013-4017, (2012).
9 Kim, S. et al. High-mobility and low-power thin-film transistors based on multilayer $MoS_2$ crystals. *Nature Communication* 3, doi:10.1038/ncomms2018, (2012).
10 Yoon, Y., Ganapathi, K. & Salahuddin, S. How Good Can Monolayer $MoS_2$ Transistors Be? *Nano Lett* 11, 3768-3773, (2011).
11 Cao, T. et al. Valley-selective circular dichroism of monolayer molybdenum disulphide. *Nature Communications* 3, (2012).
12 Gunawan, O. et al. Valley susceptibility of an interacting two-dimensional electron system. *Phys Rev Lett* 97, (2006).
13 Lee, H. S. et al. $MoS_2$ Nanosheet Phototransistors with Thickness-Modulated Optical Energy Gap. *Nano Lett* 12, 3695-3700, (2012).
14 Mak, K. F. et al. Tightly bound trions in monolayer $MoS_2$. *Nature Materials* advance online publication, (2012).
15 Mak, K. F., He, K., Shan, J. & Heinz, T. F. Control of valley polarization in monolayer $MoS_2$ by optical helicity. *Nat Nanotechnol* 7, 494-498, (2012).
16 Xiao, D., Liu, G. B., Feng, W. X., Xu, X. D. & Yao, W. Coupled Spin and Valley Physics in Monolayers of $MoS_2$ and Other Group-VI Dichalcogenides. *Phys Rev Lett* 108, (2012).
17 Zeng, H., Dai, J., Yao, W., Xiao, D. & Cui, X. Valley polarization in $MoS_2$ monolayers by optical pumping. *Nat Nanotechnol* 7, 490-493, (2012).
18 Lee, Y.-H. et al. Synthesis of Large-Area $MoS_2$ Atomic Layers with Chemical Vapor Deposition. *Advanced Materials* 24, 2320-2325, (2012).
19 Etgar, L. et al. High Efficiency Quantum Dot Heterojunction Solar Cell Using Anatase (001) TiO2 Atomic thin films. *Adv. Mater.* 24, 2202-2206, (2012).
20 Zhan, Y., Liu, Z., Najmaei, S., Ajayan, P. M. & J., L. Large-Area Vapor-Phase Growth and Characterization of $MoS_2$ Atomic Layers on a SiO2 Substrate. *Small* 8, 966-971, (2012).
21 Lin, Y. C. et al. Wafer-scale $MoS_2$ thin layers prepared by $MoO_3$ sulfurization. *Nanoscale* 4, 6637-6641, (2012).
22 Zhang, W. et al. Ultrahigh-Gain Phototransistors Based on Graphene-$MoS_2$ Heterostructures. *arXiv:*1302.1230, (2013).
23 Shi, Y. et al. van der Waals Epitaxy of $MoS_2$ Layers Using Graphene As Growth Templates. *Nano Lett.* 12, 10.1021/nl204562j, (2012).
24 Najmaei, S. et al. Vapor Phase Growth and Grain Boundary Structure of Molybdenum Disulfide Atomic Layers. *aXiv* 1301.2812, (2013).
25 Zande, A. M. v. d. et al. Grains' and' grain' boundaries' in' highly crystalline' monolayer' molybdenum' disulfide. *aXiv* 1301.1985, (2013).
26 Lee, C. et al. Anomalous Lattice Vibrations of Single- and Few-Layer $MoS_2$. *Acs Nano* 4, 2695-2700, (2010).
27 Li, H. et al. From Bulk to Monolayer $MoS_2$: Evolution of Raman Scattering. *Advanced Functional Materials* 22, 1385-1390, (2012).
28 Li, S.-L. et al. Quantitative Raman spectrum and reliable thickness identification for atomic layers on insulating substrates. *Acs Nano* 6, 7381-7388, (2012).
29 Novoselov, K. S. et al. Two-dimensional atomic crystals. *P Natl Acad Sci USA* 102, 10451-10453, (2005).

30 Li, H. et al. Fabrication of Single- and Multilayer MoS$_2$ Film-Based Field-Effect Transistors for Sensing NO at Room Temperature. *Small* 8, 63-67, (2012).

31 Li, X. et al. Large-Area Synthesis of High-Quality and Uniform Graphene Films on Copper Foils. *Science* 324, 1312-1314, (2009).

32 Podgornik, P. & Parsegian, V. A. On a possible microscopic mechanism underlying the vapor pressure paradox. *Biophysical Journal* 72, 942-952, (1997).

33 Li, X. et al. Large-Area Synthesis of High-Quality and Uniform Graphene Films on Copper Foils. *Science* 324, 1312-1314, (2009).

34 Podgornik, P. & Parsegian, V. A. On a possible microscopic mechanism underlying the vapor pressure paradox. *Biophys. J.* 72, 942-952, (1997).

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application were specifically and individually indicated to be incorporated by reference.

What is claimed is:

1. A synthesis process comprising:
   sublimation of sulfur and MoCl$_5$;
   reaction of MoCl$_5$ and S to produce gaseous MoS$_2$ species;
   transfer of the MoS$_2$ species by carrier gas;
   diffusion and precipitation of MoS$_2$ species from the gas phase onto a substrate under suitable conditions that one to four layer(s) of MoS$_2$ form on the substrate,
   wherein the substrate is highly ordered pyrolytic graphite (HOPG).

2. The synthesis process of claim 1, wherein MoCl$_5$ is reacted with sulfur at a temperature of about 300° C. to about 1000° C. to give rise to MoS$_2$ on the substrate.

3. The synthesis process of claim 2, wherein MoCl$_5$ is reacted with sulfur at a temperature of about 600° C. to about 900° C. to give rise to MoS$_2$ on the substrate.

4. The synthesis process of claim 1, wherein one layer of MoS$_2$ is formed on the substrate.

5. The synthesis process of claim 1, wherein two layers of MoS$_2$ are formed on the substrate.

6. The synthesis process of claim 1, wherein four layers of MoS$_2$ are formed on the substrate.

7. A method of producing hydrogen which comprises contacting a suitable reactant under appropriate conditions with the layered MoS$_2$ substrate prepared by the synthesis process of claim 1.

8. A method of making a large-area MoS$_2$ thin film on a surface of a substrate, the method comprising the steps of:
   reacting MoCl$_5$ with a stoichiometric excess of S in a reactor at an elevated temperature to produce gaseous MoS$_2$,
   depositing the gaseous MoS$_2$ at a pressure onto the surface of the substrate;
   wherein the amount of the MoCl$_5$ and the pressure are controlled to produce the large-area MoS$_2$ thin film on the surface of the substrate; and
   wherein the substrate is selected from the group consisting of silicon, silicon oxide, sapphire, graphite, and a combination thereof.

9. The method of claim 8, wherein the large-area MoS$_2$ thin film consists of about 1-4 layers of MoS$_2$.

10. The method of claim 8, wherein the large-area MoS$_2$ thin film consists of a monolayer or a bilayer of MoS$_2$.

11. The method of claim 8, wherein the elevated temperature is about 300° C. to about 1000° C.

12. The method of claim 8, wherein the pressure is about 2 Torr to 10 Torr.

13. The method of claim 8, wherein the large-area MoS$_2$ thin film has an area of about 1 cm$^2$ or more.

14. The method of claim 8, wherein the large-area MoS$_2$ thin film has an area of about 1 cm$^2$ to about 3 cm$^2$.

15. The method of claim 8, wherein the large-area MoS$_2$ thin film has a Raman spectra with an E$_{2g}$ band associated with in-plane vibration of Mo in the MoS$_2$ thin film, and the full width at half maximum of the E$_{2g}$ peak is about 4.2 cm$^{-1}$ or less.

16. The method of claim 8, wherein the large-area MoS$_2$ thin film has an average thickness of about 0.68 nm to about 2.54 nm.

17. The method of claim 8, wherein the large-area MoS$_2$ thin film has a Raman spectra with an A$_{1g}$ band associated with out-of-plane vibration of sulfur atoms in the MoS$_2$ thin film and an E$_{2g}$ band associated with in-plane vibration of Mo in the MoS$_2$ thin film, and
   wherein there is a frequency difference in the A$_{1g}$ band and the E$_{2g}$ band of about 20.2 cm$^{-1}$ to about 24.0 cm$^{-1}$.

18. The method of claim 8, wherein the large-area MoS$_2$ thin film has a roughness of less than 0.2 nm.

19. The method of claim 8, wherein the method further comprises balancing the partial pressure of the gaseous MoS$_2$ and the vapor pressure of the MoS$_2$ thin film on the substrate to produce the large-area MoS$_2$ thin film on the surface of the substrate consisting of 1-4 layers of MoS$_2$.

20. The method of claim 8, wherein the molar ratio of the S to the MoCl$_5$ is greater than 1000:1.

* * * * *